US012474722B2

(12) United States Patent
Tokunaga et al.

(10) Patent No.: US 12,474,722 B2
(45) Date of Patent: Nov. 18, 2025

(54) FLOW RATE CONTROL APPARATUS, FLOW RATE CONTROL METHOD, AND PROGRAM RECORDING MEDIUM IN WHICH PROGRAM FOR FLOW RATE CONTROL APPARATUS IS RECORDED

(71) Applicant: HORIBA STEC, Co., Ltd., Kyoto (JP)

(72) Inventors: Kazuya Tokunaga, Kyoto (JP); Kotaro Takijiri, Kyoto (JP)

(73) Assignee: HORIBA STEC, Co., Ltd., Kyoto (JP)

( * ) Notice: Subject to any disclaimer, the term of this patent is extended or adjusted under 35 U.S.C. 154(b) by 763 days.

(21) Appl. No.: 17/455,486

(22) Filed: Nov. 18, 2021

(65) Prior Publication Data

US 2022/0163984 A1    May 26, 2022

(30) Foreign Application Priority Data

Nov. 24, 2020  (JP) .................................. 2020-194318
Mar. 16, 2021  (JP) .................................. 2021-042802

(51) Int. Cl.
  *G05D 7/06*   (2006.01)
  *G01F 15/00*  (2006.01)
  *G05B 11/42*  (2006.01)

(52) U.S. Cl.
  CPC ......... *G05D 7/0641* (2013.01); *G01F 15/005* (2013.01); *G05B 11/42* (2013.01)

(58) Field of Classification Search
  CPC .. G05D 7/0635; G05D 7/0647; G05D 7/0623; G05D 7/0641; G05D 7/06; H01L 21/67017; H01L 21/67253; H01L 21/02; H01L 21/67276; G01F 1/363; G01F 15/005; G01F 15/003; Y10T 137/7761; F16K 17/04; F16K 37/005; G05B 11/42
  See application file for complete search history.

(56) References Cited

U.S. PATENT DOCUMENTS 5,058,440  A  *  10/1991  Graze, Jr.  ............  G01N 1/2252
                                                    73/863.83
6,046,878  A  *   4/2000  Liu  ......................  G11B 5/5582
                                                    360/77.02
(Continued)

FOREIGN PATENT DOCUMENTS

CN    101356481 A    1/2009
JP    2004280688 A   10/2004
(Continued)

OTHER PUBLICATIONS

Ibrahim Abdel Fattah, "New Applications and Developments of Fuzzy Systems", 2010, pp. 96, downloaded from chrome-extension://efaidnbmnnnibpcajpcglclefindmkaj/file:///C:/Users/olopez/Downloads/PhDthesiskoreauniversity2010%20(1).pdf (Year: 2010).*

(Continued)

*Primary Examiner* — Robert E Fennema
*Assistant Examiner* — Olvin Lopez Alvarez
(74) *Attorney, Agent, or Firm* — Alleman Hall & Tuttle LLP

(57) ABSTRACT

A flow rate control apparatus can obtain a flow rate of a fluid passing through a downstream-side valve in a form in which noise is significantly reduced with little time delay, and has improved responsiveness. The flow rate control apparatus includes: a downstream-side valve flow rate meter that measures a downstream-side valve flow rate that is a flow rate of a fluid passing through a downstream-side valve; and an observer including a downstream-side valve flow rate estimation model that estimates the downstream-side valve flow rate on the basis of an input parameter that changes an opening degree of the downstream-side valve. The observer is configured so as to be fed back a deviation between the measured value of the downstream-side valve flow rate and the estimated value of the downstream-side valve flow rate.

19 Claims, 11 Drawing Sheets

(56) References Cited

U.S. PATENT DOCUMENTS

| | | | |
|---|---|---|---|
| 10,082,806 B2* | 9/2018 | Takijiri | G05D 7/0635 |
| 11,454,993 B2* | 9/2022 | Tokunaga | G05D 7/0647 |
| 11,841,720 B2* | 12/2023 | Tokunaga | G05D 7/0647 |
| 2014/0076424 A1* | 3/2014 | Takijiri | G05D 7/0635 |
| | | | 137/486 |
| 2014/0249654 A1* | 9/2014 | Blevins | G05B 13/048 |
| | | | 700/21 |
| 2016/0124440 A1 | 5/2016 | Takijiri et al. | |
| 2019/0033896 A1* | 1/2019 | Yasuda | G01F 1/363 |
| 2019/0278305 A1* | 9/2019 | Takijiri | H01L 21/67017 |
| 2020/0026311 A1* | 1/2020 | Nagai | G01F 15/005 |
| 2021/0283679 A1 | 9/2021 | Yamamoto | |

FOREIGN PATENT DOCUMENTS

| | | |
|---|---|---|
| JP | 2013088944 A | 5/2013 |
| JP | 2020013269 A | 1/2020 |
| JP | 2020021176 A | 2/2020 |
| WO | 2007123576 A1 | 11/2007 |
| WO | 2015030097 A1 | 3/2015 |
| WO | 2020059698 A1 | 3/2020 |

OTHER PUBLICATIONS

Navada et al "A Soft Sensor for Estimation of In-Flow Rate in a Flow Process Using Pole Placement and Kalman Filter Methods", 2019, p. 6, downloaded from chrome-extension://efaidnbmnn-nibpcajpcglclefindmkaj/file:///C:/Users/olopez/Downloads/A_Soft_Sensor_for_Estimation_of_In-Flow_Rate_in_a_.pdf (Year: 2019).*

Ahrens et al., "High-Gain Observers in the Presence of Measurement Noise: A Switched-Gain Approach", 2008, pp. 7606-7611, downloaded from chrome-extension://efaidnbmnn-nibpcajpcglclefindmkaj/https://pdf.sciencedirectassets.com/271426/1-s2 (Year: 2008).*

Dahleh et al., "Lectures on Dynamic Systems and Control", pp. 14, downloaded from chrome-extension://efaidnbmnn-nibpcajpcglclefindmkaj/https://web.mat.upc.edu/carles.batlle/ioc17013/MIT_6.241/chapter_2.pdf (Year: 2004).*

Japan Patent Office, Office Action Issued in Application No. 2021-042802, Jul. 30, 2024, 5 pages.

* cited by examiner

FLOW RATE CONTROL APPARATUS, FLOW RATE CONTROL METHOD, AND PROGRAM RECORDING MEDIUM IN WHICH PROGRAM FOR FLOW RATE CONTROL APPARATUS IS RECORDED

BACKGROUND

Technical Field

The present invention relates to, for example, a flow rate control apparatus that controls a flow rate of a fluid in a semiconductor manufacturing process.

Related Art

For example, in order to control the flow rate of various gases introduced into the process chamber, a flow rate control apparatus in which various fluid devices called a mass flow controller and a control mechanism are packaged is used.

A typical flow rate control apparatus includes a flow rate sensor provided for a flow path, a downstream-side valve provided on a downstream side of the flow rate sensor, and a downstream-side valve controller that controls an opening degree of the downstream-side valve so that a measured flow rate measured by the flow rate sensor coincides with a set flow rate that is set by a user and has a temporal change.

Since a measurement point of a fluid by the flow rate sensor and a control point of the fluid by the downstream-side valve are shifted by a predetermined distance with respect to a flow direction, the measured flow rate of the flow rate sensor has a time delay with respect to the flow rate passing through the downstream-side valve. Such a time delay included in the measured flow rate becomes a problem when the responsiveness of the flow rate control required in the semiconductor manufacturing process is to be achieved.

In order to solve such a problem, it has been attempted to apply a downstream-side valve flow rate meter capable of measuring an actual flow rate (hereinafter, also referred to as a downstream-side valve flow rate) passing through the downstream-side valve to the flow rate control apparatus. For example, the downstream-side valve flow rate meter includes a conventional pressure-type flow rate sensor and a downstream-side valve flow rate calculator that calculates a downstream-side valve flow rate. The downstream-side valve flow rate calculator calculates the downstream-side valve flow rate using the flow rate (hereinafter, also referred to as a resistance flow rate) of the fluid passing through a laminar flow element measured by the pressure-type flow rate sensor and the pressure (hereinafter, also referred to as downstream-side pressure) in the volume between the pressure-type flow rate sensor and the downstream-side valve. Specifically, the downstream-side valve flow rate calculator calculates the downstream-side valve flow rate by subtracting a value obtained by multiplying a time differential value of the downstream-side pressure by a predetermined coefficient from the resistance flow rate.

However, the downstream-side valve flow rate measured by such an approach may include noise that is so large as to be problematic for flow rate control. This is because when the downstream-side pressure includes, for example, electrical noise or the like, the noise is enlarged by time differentiation of the downstream-side pressure.

In such a case, it is conceivable to remove noise by passing the downstream-side pressure or the downstream-side valve flow rate through a low-pass filter, but in this case, a time delay due to the filter occurs, so that the actual downstream-side valve flow rate cannot be obtained without a time delay.

PRIOR ART DOCUMENT

Patent Document

Patent Document 1: JP 2004-280688 A

SUMMARY

The present invention has been made in view of the above-described problems, and an object of the present invention is to provide a flow rate control apparatus capable of obtaining a flow rate of a fluid passing through a downstream-side valve in a form in which noise is significantly reduced with little time delay, and capable of improving responsiveness as compared with the related art.

A flow rate control apparatus according to the present invention includes: a fluid resistance provided in a flow path, a downstream-side valve provided on a downstream side of the fluid resistance, a downstream-side valve flow rate meter that measures a downstream-side valve flow rate that is a flow rate of a fluid passing through the downstream-side valve, on a basis of a resistance flow rate that is a flow rate of the fluid flowing through the fluid resistance and a temporal change amount of a downstream-side pressure that is a pressure in an internal volume between the fluid resistance and the downstream-side valve, and an observer including a downstream-side valve flow rate estimation model that estimates the downstream-side valve flow rate on a basis of an input parameter that changes an opening degree of the downstream-side valve, in which the observer is configured to be fed back a deviation between a measured value of the downstream-side valve flow rate output from the downstream-side valve flow rate meter and an estimated value of the downstream-side valve flow rate output from the downstream-side valve flow rate estimation model.

A flow rate control method according to the present invention is a flow rate control method using a flow rate control apparatus including a fluid resistance provided in a flow path and a downstream-side valve provided on a downstream side of the fluid resistance, the flow rate control method including: measuring a downstream-side valve flow rate, which is a flow rate of a fluid passing through the downstream-side valve, on a basis of a resistance flow rate, which is a flow rate of a fluid flowing through the fluid resistance, and a temporal change amount of a downstream-side pressure, which is a pressure in an internal volume between the fluid resistance and the downstream-side valve, and estimating the downstream-side valve flow rate using an observer including a downstream-side valve flow rate estimation model that estimates the downstream-side valve flow rate on a basis of an input parameter that changes an opening degree of the downstream-side valve, in which a deviation between the measured value of the downstream-side valve flow rate and the estimated value of the downstream-side valve flow rate output from the downstream-side valve flow rate estimation model is fed back to the observer.

With such a configuration, the observer can estimate the downstream-side valve flow rate without including a time delay and, for example, electrical noise on the basis of the downstream-side valve flow rate estimation model. In addition, since the deviation between the measured value and the estimated value of the downstream-side valve flow rate is fed back to the observer, when the measured value and the estimated value diverge from each other at the initial value or the like, such divergence is quickly eliminated, and an estimated value indicating an actual state of the flow rate control apparatus can be obtained. From these, it is possible to improve the responsiveness of the flow rate control as compared with the related art on the basis of the estimated value of the downstream-side valve flow rate output from the observer.

In order to enable the downstream-side valve flow rate to be accurately estimated by sufficiently simulating the control characteristic of the flow rate control apparatus, the flow rate control apparatus may further include a first voltage generation circuit that outputs, to the downstream-side valve, a voltage corresponding to an opening-degree command that is input, in which the downstream-side valve flow rate estimation model is modeled characteristics of the first voltage generation circuit, the downstream-side valve, and the downstream-side valve flow rate meter, and the observer receives the opening-degree command as the input parameter and estimates the downstream-side valve flow rate.

As a specific configuration example for increasing the accuracy of the estimated value of the downstream-side valve flow rate, the downstream-side valve flow rate estimation model simulates a time delay in the first voltage generation circuit.

In order to enable the observer to quickly eliminate an error in the estimated value due to a difference between the estimated value and the initial value, the observer may further include an observer gain unit that multiplies a deviation between the measured value of the downstream-side valve flow rate and the estimated value of the downstream-side valve flow rate by an observer gain.

In order to enable early elimination of the divergence when the estimated value of the downstream-side valve flow rate largely diverges from the measured value and the observer cannot reflect the actual state and to make the observer robust against sudden noise or the like not originating from the system when the observer can estimate the downstream-side valve flow rate with sufficient accuracy, the observer gain unit may include a first observer gain used when the flow rate of the fluid flowing through the flow path is stable at a predetermined value and a second observer gain used when the flow rate of the fluid flowing through the flow path changes and having a value larger than the first observer gain.

In order to improve the responsiveness related to the control of the downstream-side valve flow rate as compared with the related art, a downstream-side valve controller that controls the opening degree of the downstream-side valve may be further included, and the downstream-side valve controller may be configured to generate the opening-degree command on the basis of a deviation between a target value of a set flow rate and an estimated value of the downstream-side valve flow rate output from the observer.

As a specific configuration of the feedback control based on the downstream-side valve flow rate estimated by the observer, the downstream-side valve controller includes a PID controller that performs a PID calculation on the basis of a deviation between a target value of a set flow rate and an estimated value of the downstream-side valve flow rate output from the observer, and an opening-degree command generator that generates the opening-degree command depending on a PID calculation result from the PID controller.

In order to configure the downstream-side valve flow rate meter using hardware such as a flow rate sensor used in a conventional flow rate control apparatus, the downstream-side valve flow rate meter includes: an upstream-side pressure sensor that is provided on an upstream side of the fluid resistance and measures an upstream-side pressure; a downstream-side pressure sensor that is provided between the fluid resistance and the downstream-side valve and measures the downstream-side pressure; a resistance flow rate calculator that calculates the resistance flow rate on the basis of the upstream-side pressure and the downstream-side pressure; and a downstream-side valve flow rate calculator that calculates the downstream-side valve flow rate by subtracting a value obtained by multiplying a temporal change amount of the downstream-side pressure by a predetermined coefficient from the resistance flow rate.

In order to further improve the responsiveness by increasing the control margin of the downstream-side valve and suppressing the fluctuation of a supply pressure of the fluid, the flow rate control apparatus may further include an upstream-side valve provided on the upstream side of the upstream-side pressure sensor and an upstream-side valve controller that controls the opening degree of the upstream-side valve.

When the set flow rate rises or falls, opening-degree change directions of the upstream-side valve and the downstream-side valve become opposite to each other. In order to enable the sensitivity as a pressure-type flow rate sensor to be maintained high by keeping the average pressure before and after the fluid resistance at a low pressure while enabling a desired flow rate to be obtained at a high speed by changing the front-back pressure of the fluid resistance at a high speed, an upstream-side valve flow rate calculator that calculates the upstream-side valve flow rate passing through the upstream-side valve by adding a value obtained by multiplying the temporal change amount of the upstream-side pressure by a predetermined coefficient from the resistance flow rate may be further included, and the upstream-side valve controller may control the opening degree of the upstream-side valve so as to reduce the deviation between the set flow rate and the upstream-side valve flow rate.

In order to further improve the control performance by reducing the noise influence also for the upstream-side valve flow rate, it is only required to further include: an upstream-side valve flow rate calculator that calculates an upstream-side valve flow rate passing through the upstream-side valve by adding a value obtained by multiplying the temporal change amount of the upstream-side pressure by a predetermined coefficient from the resistance flow rate; and a sub-observer including an upstream-side valve flow rate estimation model that estimates the upstream-side valve flow rate on the basis of an input parameter that changes the opening degree of the upstream-side valve, in which the upstream-side valve controller controls the opening degree of the upstream-side valve so as to reduce a deviation between a target value of a set flow rate and an estimated value of the upstream-side valve flow rate output from the sub-observer.

As a specific configuration example in which the supply pressure of the fluid supplied to the flow rate control apparatus can be maintained constant, the upstream-side valve controller controls the opening degree of the upstream-side valve so as to reduce the deviation between the set pressure and the upstream-side pressure.

In order to maintain the absolute value of the pressure before and after the fluid resistance at a low pressure by maintaining the opening degree of the downstream-side valve at a predetermined opening degree even when the target value of the set flow rate changes, the upstream-side valve controller may control the opening degree of the upstream-side valve so as to reduce the deviation between the set voltage corresponding to the opening degree maintained by the downstream-side valve and the voltage applied to the downstream-side valve. With such a configuration, it is possible to improve the sensitivity of the downstream-side valve flow rate meter that performs the flow rate measurement based on the pressure. For example, the pressure before and after the fluid resistance may be maintained at a low pressure by keeping the opening degree of the downstream-side valve in a fully open state or in the vicinity thereof. In this way, when the pressure-type flow rate detection method is used, it is possible to increase measurement sensitivity and improve control responsiveness.

The fluid resistance may be a laminar flow element, a flow dividing element, or an orifice in order to clearly partition the volume between the fluid resistance and the downstream-side valve, which is a precondition for the measurement of the downstream-side valve flow rate by the downstream-side valve flow rate meter, and to increase the measurement accuracy of the downstream-side valve flow rate so as to obtain an accurate volume value.

Conventionally, when some kind of abnormality occurs in a flow rate sensor or the like in a flow rate control apparatus used in a semiconductor manufacturing process, an alarm is output to a user or a control apparatus serving as a master, or a flow rate displayed outside is set to an impossible value such as a negative value to notify the abnormality. Further, when an abnormality occurs, the control valve is changed to a safe state such as fully closed to interrupt the process even during the process. In a case where the process is interrupted, even if the process is restarted, the same result or effect as before the interruption is often not obtained. For this reason, in particular, in a batch processing type process apparatus, damage of wafer scraps due to interruption becomes large, and for example, a yield in the case of interruption becomes zero or almost zero.

For the purpose of reducing the loss due to the interruption of the process as described above, for example, even if an abnormality occurs in various sensors for measuring the flow rate, in order to continue the process and ensure a certain degree of yield, the observer may further include an abnormal mode switching unit that operates the observer in an abnormal mode in which feedback of the measured value of the downstream-side valve flow rate output from the downstream-side valve flow rate meter is not performed at least when an abnormality occurs in the downstream-side valve flow rate meter.

With such a configuration, in the abnormal mode, the flow rate control can be continued only with the estimated value of the downstream-side valve flow rate output from the observer without using the output of the downstream-side valve flow rate meter whose value is unreliable due to a failure or the like. Therefore, since the flow rate control can be continued based on a value close to the flow rate actually flowing to some extent, for example, the yield of the wafer during the process can be maintained at a predetermined value.

When an abnormality occurs in the downstream-side valve flow rate meter, in order to enable the observer to output an estimated value close to a flow rate flowing at that time by using a parameter used at a time when the downstream-side valve flow rate meter is normal and to maintain a wafer yield or the like at a high value, the observer may further include an observer gain unit that multiplies a deviation between a measured value of the downstream-side valve flow rate and an estimated value of the downstream-side valve flow rate by an observer gain at least in a state in which the downstream-side valve flow rate meter is normally operating, a normal value storage unit that stores a deviation between the measured value of the downstream-side valve flow rate and the estimated value of the downstream-side valve flow rate or a value obtained by performing a predetermined calculation on the deviation as a normal value at least in a state in which the downstream-side valve flow rate meter is normally operating, and a rollback unit that inputs a value based on the normal value to the downstream-side valve flow rate estimation model.

When an abnormality occurs in the downstream-side valve flow rate meter with a simple configuration, in order to continue the flow rate control only with the estimated value of the observer without using the measured value of the downstream-side valve flow rate meter for the flow rate control, the observer includes an observer gain unit that multiplies a deviation between the measured value of the downstream-side valve flow rate and the estimated value of the downstream-side valve flow rate by an observer gain, and the observer gain unit is configured to use a zero value as the observer gain in the abnormal mode.

A specific aspect of the abnormal mode switching unit includes the one configured to determine whether the downstream-side valve flow rate meter is normally operating or an abnormality has occurred based on a measured value of the downstream-side valve flow rate output from the downstream-side valve flow rate meter or an internal parameter used in the downstream-side valve flow rate meter.

In order to obtain a flow rate control characteristic equivalent to that of the flow rate control apparatus according to the present invention by, for example, updating a program for an existing flow rate control apparatus including a fluid resistance provided in a flow path and a downstream-side valve provided on a downstream side of the fluid resistance, it is preferable to use a program for a flow rate control apparatus, the program causing a computer to function as: a downstream-side valve flow rate meter that measures a downstream-side valve flow rate that is a flow rate of a fluid passing through the downstream-side valve, on a basis of a resistance flow rate that is a flow rate of a fluid flowing through the fluid resistance and a temporal change amount of a downstream-side pressure that is a pressure in an internal volume between the fluid resistance and the downstream-side valve; and an observer including a downstream-side valve flow rate estimation model that estimates the downstream-side valve flow rate on a basis of an input parameter that changes an opening degree of the downstream-side valve, in which the observer is configured to be fed back a deviation between a measured value of the downstream-side valve flow rate output from the downstream-side valve flow rate meter and an estimated value of the downstream-side valve flow rate output from the downstream-side valve flow rate estimation model.

Note that, the program for the flow rate control apparatus may be distributed electronically or may be recorded in a program recording medium such as a CD, a DVD, or a flash memory.

As described above, since the flow rate control apparatus according to the present invention includes the observer that estimates the downstream-side valve flow rate that is the flow rate of the flow rate passing through the downstream-side valve, it is possible to obtain the downstream-side valve flow rate with reduced time delay and noise. Therefore, according to the present invention, it is possible to improve responsiveness and accuracy in flow rate control as compared with the related art.

DETAILED DESCRIPTION

A flow rate control apparatus 100 according to a first embodiment will be described with reference to FIGS. 1 to 3.

The flow rate control apparatus 100 of the first embodiment is used, for example, to supply a dilution gas such as a process gas or a noble gas to a chamber at a set flow rate in a semiconductor manufacturing process. Here, the set flow rate includes, for example, a stepwise temporal change of rising or falling stepwise from a certain target value to another target value. The flow rate control apparatus 100 is configured to follow the step flow rate command of the set flow rate within a predetermined time. Note that the predetermined time can be set as a time that can satisfy the quality of the semiconductor to be manufactured.

Figure 1:
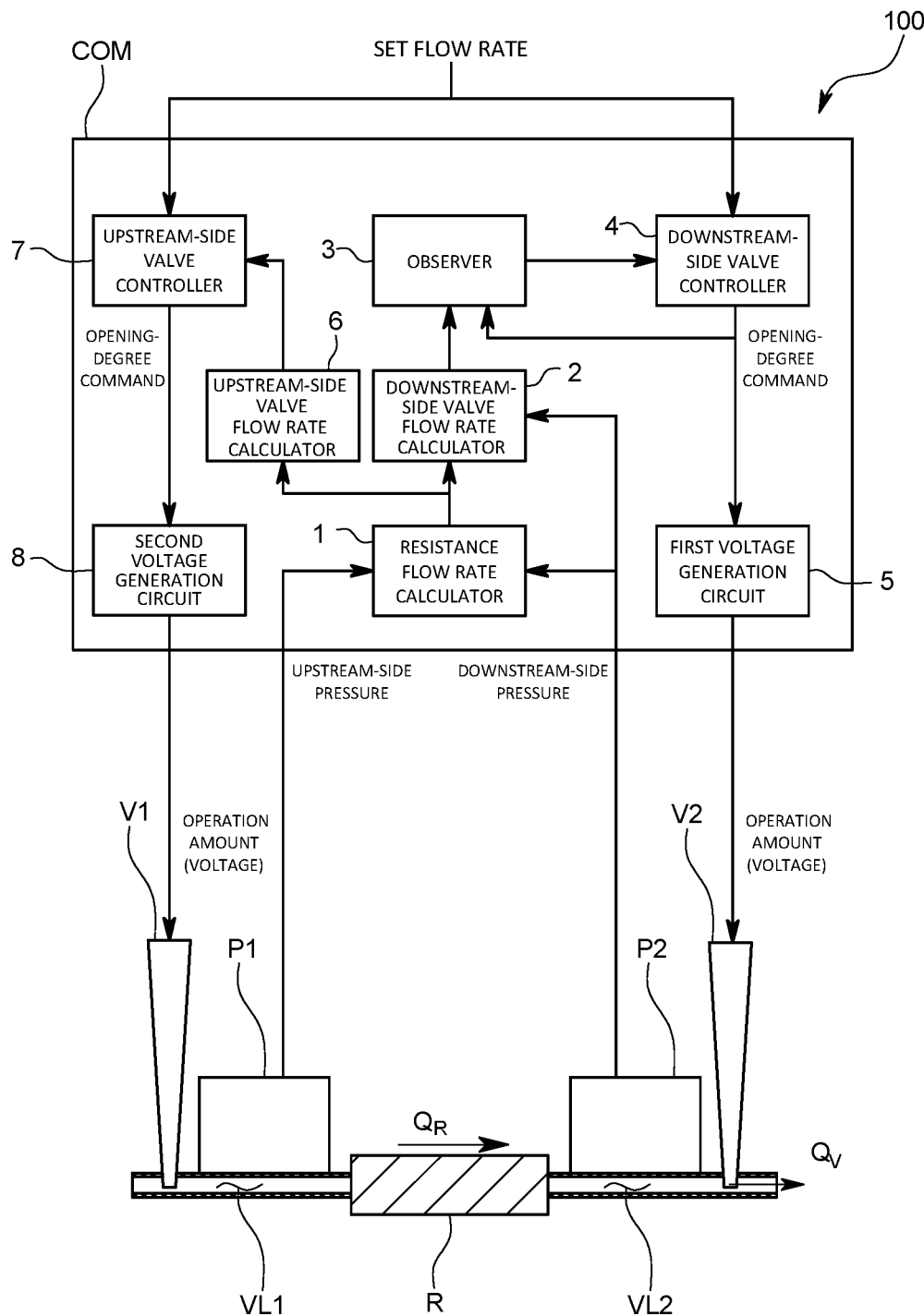
FIG. 1 is a schematic diagram illustrating a configuration of a flow rate control apparatus according to a first embodiment of the present invention.

Specifically, as illustrated in FIG. 1, the flow rate control apparatus 100 includes a fluid device including a sensor and a valve provided in a flow path, and a control apparatus COM that controls the fluid device. Note that, the flow path is formed as, for example, a plurality of internal flow paths formed in a block (not illustrated), and at least one end portion of the internal flow path opens on a component mounting surface to which the fluid device is mounted in the block.

A supply pressure sensor (not illustrated), an upstream-side valve V1, an upstream-side pressure sensor P1, a fluid resistance R, a downstream-side pressure sensor P2, and a downstream-side valve V2 are provided in order from the upstream side with respect to the flow path. Here, the fluid resistance R is, for example, a laminar flow element, and generates a differential pressure corresponding to a gas flow rate flowing before and after the laminar flow element.

The upstream-side pressure sensor P1 measures a pressure of a gas charged in an upstream-side volume VL1, which is the volume between the upstream-side valve V1 and the fluid resistance R in the flow path. In the following description, the pressure measured by the upstream-side pressure sensor P1 is also referred to as an upstream-side pressure.

The downstream-side pressure sensor P2 measures a pressure of a gas charged in a downstream-side volume VL2, which is the volume between the fluid resistance R and the downstream-side valve V2 in the flow path. In the following description, the pressure measured by the downstream-side pressure sensor P2 is also referred to as a downstream-side pressure.

In the first embodiment, the upstream-side pressure sensor P1 and the downstream-side pressure sensor P2 are of the same type, for example, and a gas is guided from a flow path to a pressure-sensitive surface formed of a diaphragm, for example. The displacement of the pressure-sensitive surface is measured by, for example, a capacitance-type displacement sensor, and each pressure is measured from the displacement. As described above, the upstream-side pressure sensor P1 and the downstream-side pressure sensor P2 respectively measure the pressures of the two volumes formed by the upstream-side valve V1, the fluid resistance R, and the downstream-side valve V2.

The upstream-side valve V1 and the downstream-side valve V2 are of the same type in the first embodiment, and are, for example, piezo valves in which a valve body is driven with respect to a valve member by a piezo element. In the first embodiment, the upstream-side valve V1 controls the pressure in the upstream-side volume on the basis of the upstream-side pressure measured by the upstream-side pressure sensor P1. On the other hand, the downstream-side valve V2 provided on the most downstream side in the fluid device controls the entire gas flow rate flowing out from the fluid device.

Next, the control apparatus COM will be described in detail.

The control apparatus COM is, for example, a so-called computer including a CPU, a memory, an A/D converter, a D/A converter, and an input/output unit. Specifically, the function is implemented using a microcomputer board, but a general computer may be used. The control apparatus COM implements functions as at least the resistance flow rate calculator 1, the downstream-side valve flow rate calculator 2, the observer 3, the downstream-side valve controller 4, the first voltage generation circuit 5, the upstream-side valve flow rate calculator 6, the upstream-side valve controller 7, and the second voltage generation circuit 8 when various devices cooperate with each other by executing a program for the flow rate control apparatus stored in the memory.

The resistance flow rate calculator 1 constitutes a so-called pressure-type flow rate sensor together with the upstream-side pressure sensor P1, the fluid resistance R, and the downstream-side pressure sensor P2. That is, the resistance flow rate calculator 1 calculates the resistance flow rate, which is the gas flow rate flowing through the fluid resistance R, using the upstream-side pressure measured by the upstream-side pressure sensor P1 and the downstream-side pressure measured by the downstream-side pressure sensor P2 as inputs, and outputs the result to the downstream-side valve flow rate calculator 2.

Here, as a flow rate calculation formula used in the resistance flow rate calculator 1, a formula adopted in an existing pressure-type flow rate sensor can be used. The resistance flow rate calculated by the resistance flow rate calculator 1 changes continuously, but a predetermined time delay occurs with respect to the actual flow rate passing through the downstream-side valve V2 realized by the control of the downstream-side valve V2.

Hereinafter, the flow rate passing through the downstream-side valve V2 is also referred to as a downstream-side valve flow rate. Further, in the first embodiment, a value calculated based on outputs of the upstream-side pressure sensor P1 and the downstream-side pressure sensor P2 is defined as a measured value for the downstream-side valve flow rate. On the other hand, on the basis of the internal output of the downstream-side valve controller 4 and a mathematical model, the downstream-side valve flow rate calculated without directly using the outputs of the upstream-side pressure sensor P1 and the downstream-side pressure sensor P2 is defined as an estimated value.

The downstream-side valve flow rate calculator 2 calculates the downstream-side valve flow rate, which is the gas flow rate flowing out from the downstream-side valve V2, on the basis of the resistance flow rate calculated by the resistance flow rate calculator 1 and the downstream-side pressure measured by the downstream-side pressure sensor P2, and outputs the result to the observer 3. More specifically, the downstream-side valve flow rate calculator 2 calculates the downstream-side valve flow rate on the basis of the fact that the constant multiple of the difference between the resistance flow rate, which is the gas flow rate flowing into the downstream-side volume VL2 between the fluid resistance R and the downstream-side valve V2, and the downstream-side valve flow rate, which is the gas flow rate flowing out from the downstream-side volume VL2, is equal to the temporal change amount of the downstream-side pressure. Specifically, in a case where the downstream side pressure is $P_2$, the size of the downstream side volume VL2 is $V_2$, the temperature of the gas is T, the gas constant is $R_G$, and the mass is $n_2$, $P_2 = n_2 R_G T / V_2$ is derived by applying a gas state equation for the downstream-side volume VL2. In addition, since the time differential value of the mass $n_2$ is proportional to the difference between the resistance flow rate $Q_R$ flowing into the downstream-side volume VL2 and the downstream-side valve flow rate $Q_{V2}$ flowing out from the downstream-side volume VL2, the downstream-side valve flow rate $Q_{V2}$ can be finally calculated by the following equation. $Q_{V2} = Q_R - A \cdot d/dt (P_2)$: where d/dt is a time differential operator, and A is a constant determined by a gas temperature T, a gas constant $R_G$, and the like.

In the first embodiment, the upstream-side pressure sensor P1, the fluid resistance R, the downstream-side pressure sensor P2, and the resistance flow rate calculator 1 constitute a so-called pressure-type flow rate sensor. In addition, the downstream-side valve flow rate calculator 2 is further added to the pressure-type flow rate sensor, thereby configuring the downstream-side valve flow rate meter VFS.

The observer 3 estimates the downstream-side valve flow rate on the basis of a mathematical control system model and input parameters for changing the opening degree of the downstream-side valve V2. The downstream-side valve flow rate estimated by the observer 3 is output to the downstream-side valve controller 4.

The downstream-side valve controller 4 controls the opening degree of the downstream-side valve V2 so as to reduce a deviation between the set flow rate set by the user and the downstream-side valve flow rate estimated by the observer 3. In the first embodiment, the downstream-side valve controller 4 generates an opening-degree command corresponding to the deviation and outputs the opening-degree command to the first voltage generation circuit 5.

The first voltage generation circuit 5 applies a voltage corresponding to the opening-degree command to the downstream-side valve V2. In the first voltage generation circuit 5, for example, a time delay of a first-order delay occurs with respect to the opening-degree command.

The upstream-side valve flow rate calculator 6 calculates the upstream-side valve flow rate, which is the gas flow rate flowing into the upstream-side volume VL1 from the upstream-side valve V1, based on the resistance flow rate calculated by the resistance flow rate calculator 1 and the upstream-side pressure measured by the upstream-side pressure sensor P1, and outputs the result to the upstream-side valve controller 7. More specifically, the upstream-side valve flow rate calculator 6 calculates the upstream-side valve flow rate on the basis of the fact that the constant multiple of the difference between the upstream-side valve flow rate, which is the gas flow rate flowing into the upstream-side volume VL1 between the upstream-side valve V1 and the fluid resistance R, and the resistance flow rate, which is the gas flow rate flowing out from the upstream-side volume VL1, is equal to the temporal change amount of the upstream-side pressure. Specifically, when the upstream-side pressure is $P_1$, the size of the upstream-side volume VL1 is V1, the temperature of the gas is T, the gas constant is $R_G$, and the mass is $n_1$, $P_1 = n_1 R_G T / V_1$ is derived by applying a gas state equation for the upstream-side volume VL1. In addition, since the time differential value of the mass $n_1$ is proportional to the difference between the upstream-side valve flow rate $Q_{V1}$ flowing into the upstream-side volume VL1 and the resistance flow rate $Q_R$ flowing out from the upstream-side volume VL1, the upstream-side valve flow rate $Q_{V1}$ can be finally calculated by the following equation. $Q_{V1} = Q_R + A \cdot d/dt (P_1)$: where d/dt is a time differential operator, and A is a constant determined by a gas temperature T, a gas constant $R_G$, and the like.

Note that, the upstream-side valve flow rate calculator 6 shares the upstream-side pressure sensor P1, the fluid resistance R, the downstream-side pressure sensor P2, and the resistance flow rate calculator 1 constituting a pressure-type flow rate sensor in the downstream-side valve flow rate meter VFS. That is, the upstream-side valve flow rate calculator 6 is configured to function as the upstream-side valve flow rate meter by sharing the pressure-type flow rate sensor with the downstream-side valve flow rate meter VFS.

The upstream-side valve controller 7 controls the upstream-side valve V1 on the basis of the set flow rate set by the user and the upstream-side valve flow rate calculated by the upstream-side valve flow rate calculator 6. That is, the upstream-side valve controller 7 controls the upstream-side valve V1 so as to reduce the deviation between the target value of the set flow rate set by the user and the measured value of the upstream-side valve flow rate. More specifically, the upstream-side valve controller 7 generates an opening-degree command indicating the opening degree to be achieved by the upstream-side valve V1 by PID calculation based on the deviation between the set flow rate and the upstream-side valve flow rate, and inputs the opening-degree command to the second voltage generation circuit. The second voltage generation circuit applies a voltage corresponding to the opening-degree command to the upstream-side valve V1. That is, unlike the downstream-side valve V2, the upstream-side valve V1 is controlled based on the measured value instead of the estimated value by the observer. In addition, the set flow rates input to the upstream-side valve controller 7 and the downstream-side valve controller 4 are the same, and are input in synchronization.

Next, details of the control system related to the downstream-side valve V2 and details of the observer 3 and the downstream-side valve controller 4 will be described with reference to block diagrams of FIGS. 2 and 3.

Figure 2:
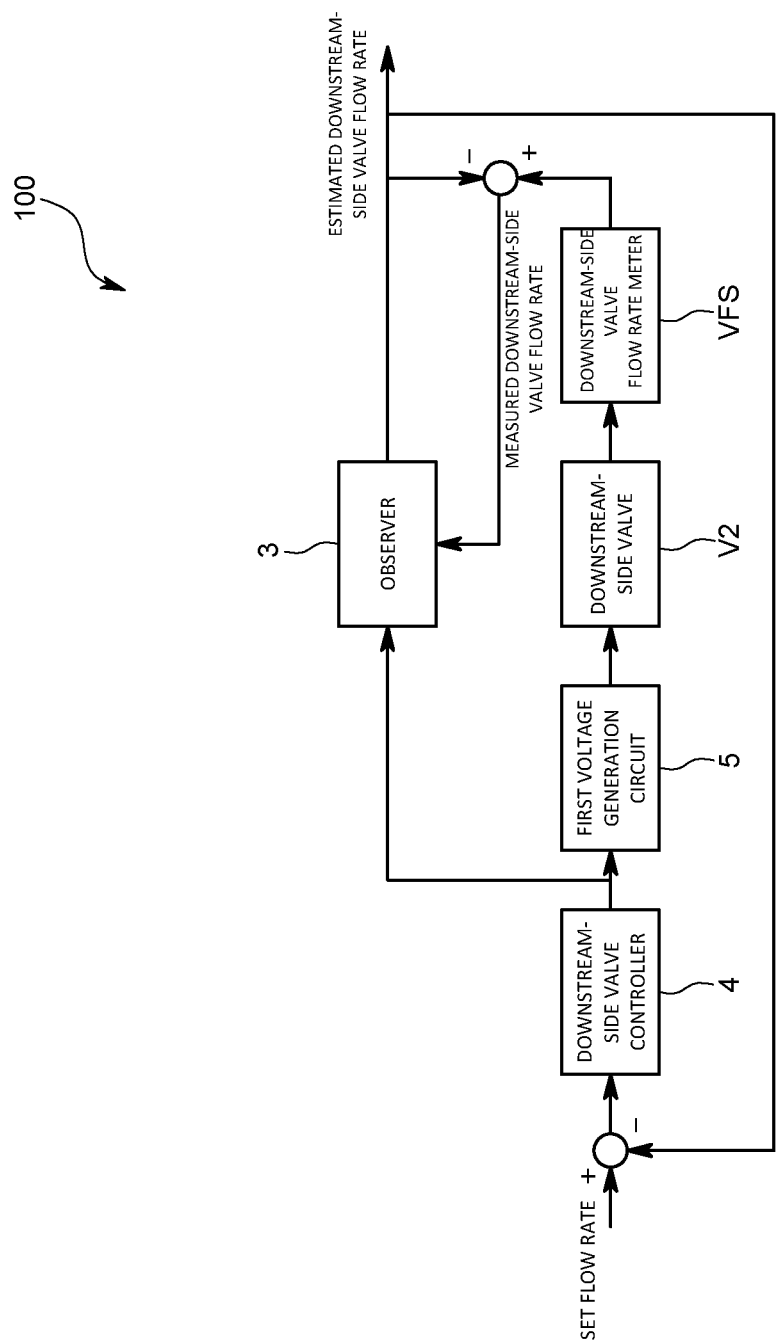
FIG. 2 is a block diagram schematically illustrating a control system related to a downstream-side valve of the flow rate control apparatus according to the first embodiment.

As illustrated in the block diagram of FIG. 2, the control system of the downstream-side valve V2 includes a real system that measures the downstream-side valve flow rate on the basis of the output of the hardware and affects the actual downstream-side valve flow rate, and an imaginary system that estimates the downstream-side valve flow rate on the basis of a mathematical model. The real system includes a downstream-side valve controller 4, a first voltage generation circuit 5, a downstream-side valve V2, and a downstream-side valve flow rate meter VFS. On the other hand, the imaginary system includes an observer 3.

The downstream-side valve flow rate estimated by the observer 3 is fed back to the downstream-side valve controller 4. That is, the deviation between the target value of the set flow rate and the estimated value of the downstream-side valve flow rate is input to the downstream-side valve controller 4. The deviation between the downstream-side valve flow rate estimated by the observer 3 and the downstream-side valve flow rate measured by the downstream-side valve flow rate meter is fed back to the observer 3. The same opening-degree command as that input from the downstream-side valve controller 4 to the real system is input to the observer 3, and the observer 3 outputs an estimated value of the downstream-side valve flow rate corresponding to the opening-degree command.

Figure 3:
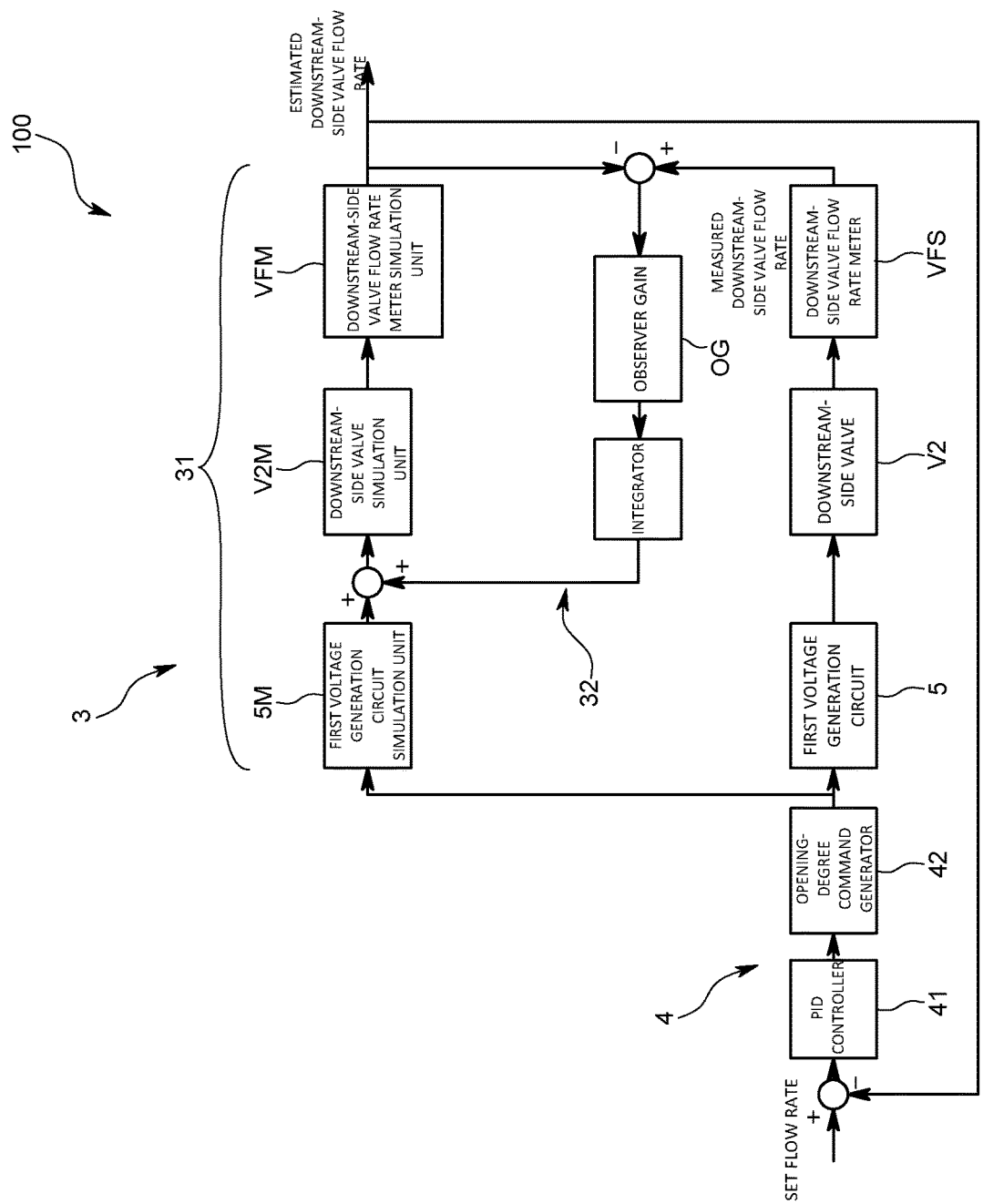
FIG. 3 is a block diagram illustrating details of an observer and a downstream-side valve controller according to the first embodiment.

As illustrated in a detailed block diagram of FIG. 3, the observer 3 includes a downstream-side valve flow rate estimation model 31 that simulates the first voltage generation circuit 5, the downstream-side valve V2, and the downstream-side valve flow rate meter VFS to be controlled in the real system. That is, the downstream-side valve flow rate estimation model 31 includes a first voltage generation circuit simulation unit 5M, a downstream-side valve simulation unit V2M, and a downstream-side valve flow rate meter simulation unit VFM corresponding to the first voltage generation circuit 5, the downstream-side valve V2, and the downstream-side valve flow rate meter VFS, respectively.

The first voltage generation circuit simulation unit 5M simulates the time delay of the voltage actually output from the first voltage generation circuit 5 with respect to the opening-degree command. In addition, the downstream-side valve simulation unit V2M simulates the control characteristic as the downstream-side valve V2, that is, the piezo valve with reference to, for example, a theoretical formula, and outputs the corresponding downstream-side valve flow rate with respect to the voltage applied to the downstream-side valve V2. Note that, the downstream-side valve simulation unit V2M may simulate the valve characteristic by referring to, for example, a lookup table that stores a relationship with the flow rate, the front-back pressure of the valve, the temperature, the voltage corresponding to the opening degree, and the like. In addition, the downstream-side valve flow rate meter simulation unit VFM simulates the time delay appearing in the measured value with respect to the actual downstream-side valve flow rate. Here, the time delay simulated by the downstream-side valve flow rate meter simulation unit VFM is not caused by the deviation between the control point and the measurement point, but is caused in the electric circuit or by calculation. Since the downstream-side valve flow rate estimation model 31 is a mathematical model, electrical noise is not superimposed on the estimated value of the downstream-side valve flow rate output each time the opening-degree command is input, and only a change in the downstream-side valve flow rate appears.

The observer 3 further includes an observer gain unit 32 that multiplies the deviation between the measured value and the estimated value of the downstream-side valve flow rate by a predetermined observer gain OG. An integrator is provided corresponding to the observer gain OG, and the output of the integrator is added to the voltage output from the first voltage generation circuit simulation unit 5M.

Finally, the downstream-side valve controller 4 will be described. The downstream-side valve controller 4 includes a PID controller 41 to which a deviation between the set flow rate and the downstream-side valve flow rate estimated by the observer 3 is input, and an opening-degree command generator 42 that outputs an opening-degree command corresponding to a PID calculation result output from the PID controller 41. That is, the downstream-side valve flow rate measured by the downstream-side valve flow rate meter VFS is used only for feedback to the observer 3, and is not directly used to determine the voltage applied to the downstream-side valve V2. The downstream-side valve V2 is controlled based on the deviation between the target value of the set flow rate not including electrical noise and the estimated value of the flow rate of the observer 3.

With the flow rate control apparatus 100 configured as described above, the observer 3 can estimate the downstream-side valve flow rate of the fluid passing through the downstream-side valve V2 in a form that hardly includes a time delay and electrical noise. Since the downstream-side valve controller 4 controls the opening degree of the downstream-side valve V2 on the basis of such an estimated value, flow rate control with better responsiveness than before can be achieved.

In addition, since the upstream-side valve V1 is controlled so as to reduce the deviation between the measured upstream-side valve flow rate and the set flow rate, and the downstream-side valve V2 is controlled so as to reduce the deviation between the estimated flow rate estimated by the observer 3 and the set flow rate, the differential pressure before and after the fluid resistance R can be changed at a high speed. For example, when the set flow rate is made larger than the current flow rate, the upstream-side valve controller 7 controls the upstream-side valve V1 so as to increase the upstream-side pressure, and the downstream-side valve controller 4 controls the downstream-side valve V2 as to decrease the downstream-side pressure. When the set flow rate is smaller than the current flow rate, the reverse operation described above is realized. Therefore, since the upstream-side pressure and the downstream-side pressure can be changed in opposite directions by the two valves, the increase and decrease of the flow rate can be adjusted at a high speed. Furthermore, the average pressure of the upstream-side pressure and the downstream-side pressure can be maintained at a substantially constant pressure. In addition, by adjusting the average pressure to a low pressure suitable for calculating the resistance flow rate, the sensitivity as a pressure-type flow rate sensor can also be maintained high. As a result, the sensitivity of the measured value of the upstream-side valve flow rate and the estimated value of the downstream-side valve flow rate can also be increased, and the responsiveness in the flow rate control can be further improved.

Figure 4:
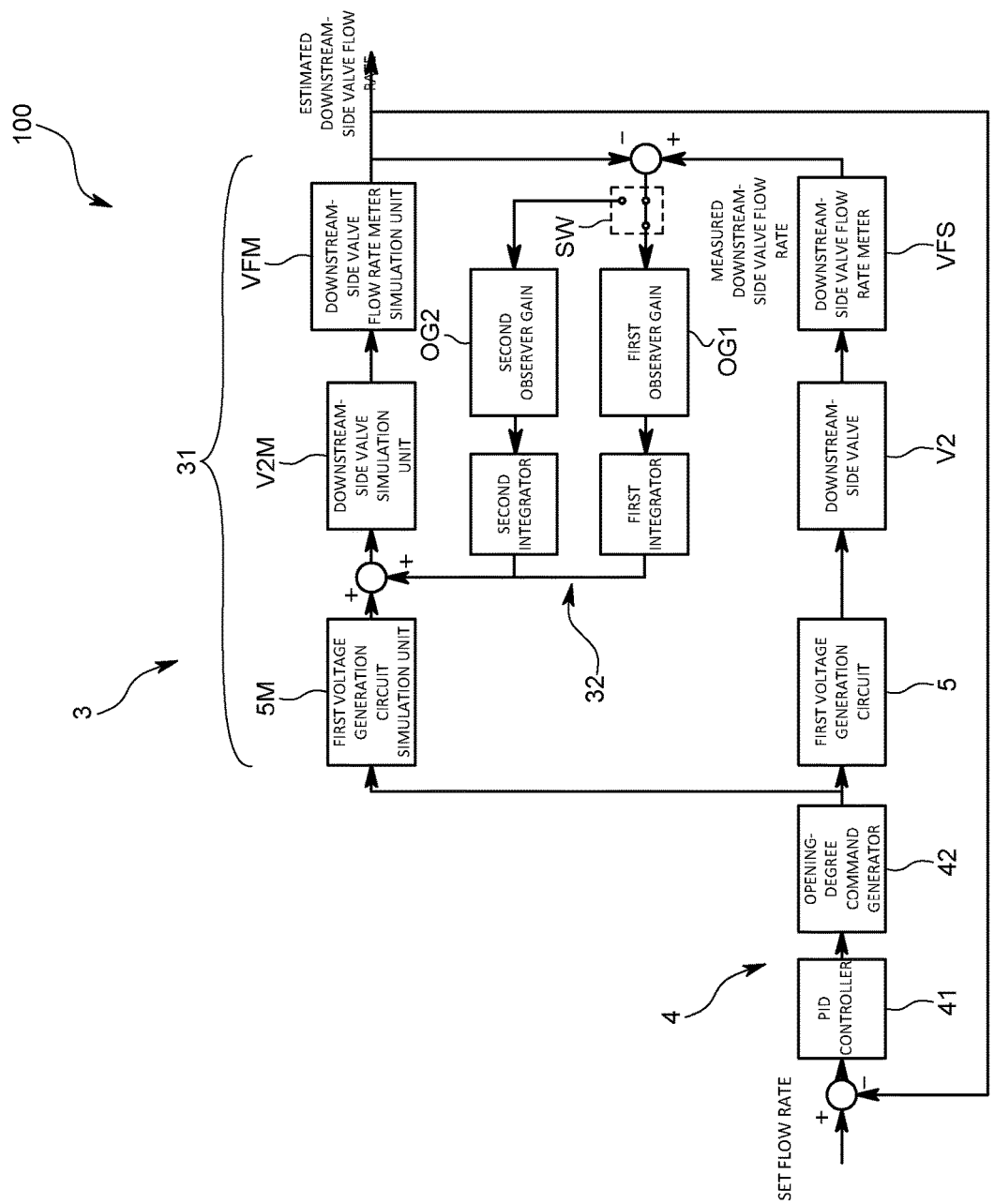
FIG. 4 is a block diagram showing a configuration of a first modification of the flow rate control apparatus in the first embodiment.

Next, a first modification of the flow rate control apparatus 100 of the first embodiment will be described with reference to FIG. 4. In the first modification, a configuration of an observer gain unit 32 of an observer 3 is different from that of the above-described embodiment. Specifically, the observer gain unit 32 includes a first observer gain OG1 that is used when the flow rate of the fluid flowing through the flow path is stable, a second observer gain OG2 that is used when the flow rate of the fluid flowing through the flow path changes by a predetermined amount or more and has a value larger than that of the first observer gain OG1, and a switch SW that determines which observer gain is used depending on the state of the flow rate. An integrator is provided corresponding to each of the observer gains OG1 and OG2, and the output of the integrator is added to the voltage output from the first voltage generation circuit simulation unit 5M.

For example, the switch SW causes the first observer gain OG1 to be multiplied by a deviation between the measured value and the estimated value of the downstream-side valve flow rate in a section in which the target value of the set flow rate is maintained at a constant value, and causes the second observer gain OG2 to be multiplied by the deviation when the target value of the set flow rate rises or falls from a certain value to another value.

With such a configuration, when the flow rate greatly changes, the second observer gain OG2 is used to greatly correct the value of the voltage output from the first voltage generation circuit simulation unit 5M. As a result, the divergence of the estimated value by the observer 3 is corrected in a short time. On the other hand, when the target value of the set flow rate is in a section of a constant value and the flow rate is stable, the first observer gain OG1 is used to suppress the correction sensitivity to the deviation. That is, when there is almost no difference between the estimated value and the measured value, the observer 3 is less likely to receive a sudden disturbance influence, and the robustness becomes high.

Figure 5:
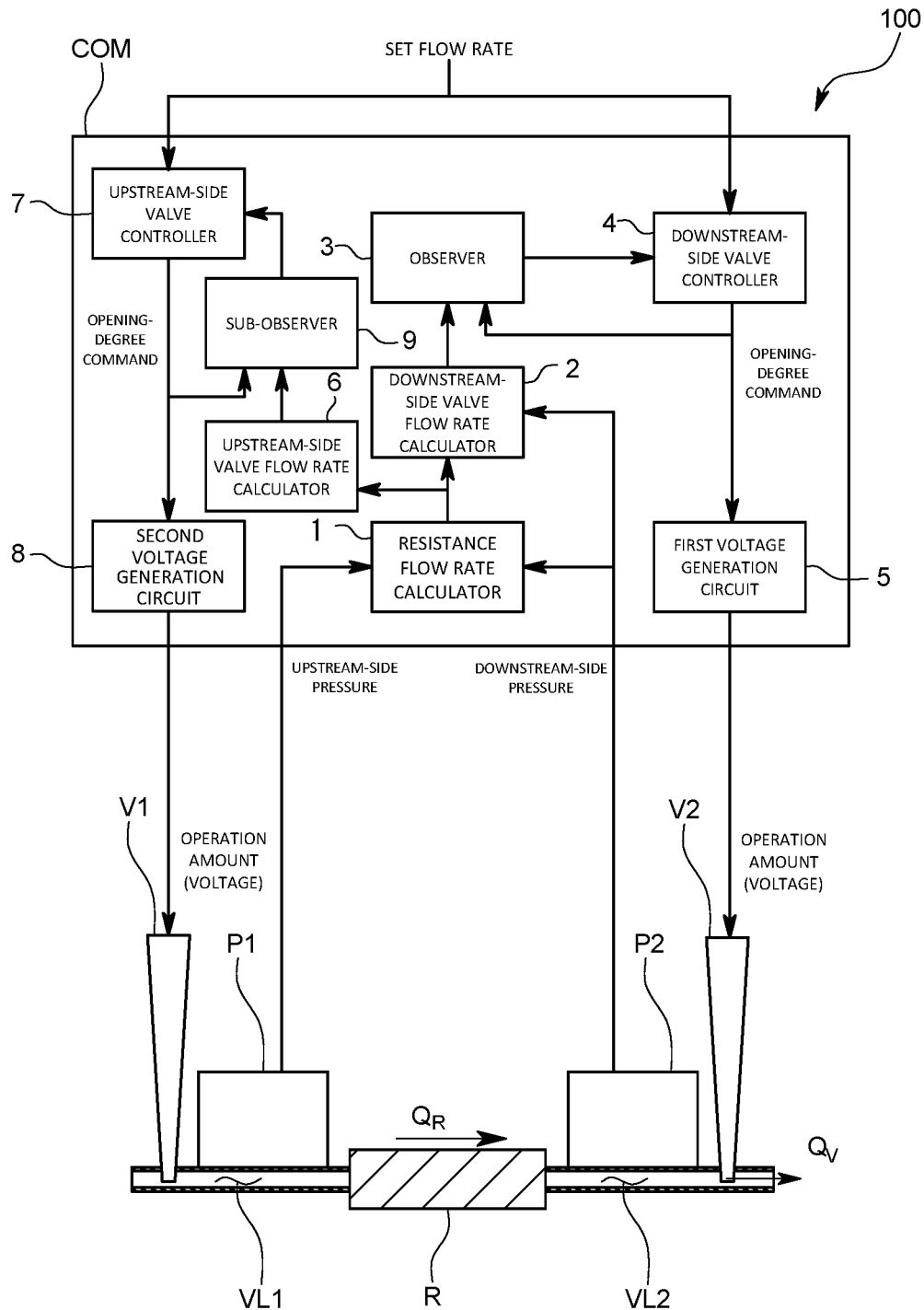
FIG. 5 is a schematic diagram showing a configuration of a second modification of the flow rate control apparatus in the first embodiment.

Next, a second modification of the flow rate control apparatus 100 of the first embodiment will be described with reference to FIG. 5. In the second modification, not only the downstream-side valve flow rate but also the upstream-side valve flow rate is estimated by the observer, and flow rate control with better responsiveness is achieved. Specifically, the sub-observer 9 including an upstream-side valve flow rate estimation model that estimates the upstream-side valve flow rate on the basis of an input parameter that changes the opening degree of the upstream-side valve V1 is further provided, and the upstream-side valve controller 7 controls the opening degree of the upstream-side valve V1 so as to reduce a deviation between a target value of the set flow rate and an estimated value of the upstream-side valve flow rate output from the sub-observer 9. Note that, the specific configuration of the sub-observer 9 has a configuration corresponding to the observer 3 that estimates the downstream-side valve flow rate illustrated in FIGS. 2 and 3. That is, the sub-observer 9 estimates the upstream-side valve flow rate on the basis of the opening-degree command output from the upstream-side valve controller 7, and multiplies the deviation between the estimated value and the measured value calculated by the upstream-side valve flow rate calculator 6 by a predetermined observer gain to be fed back into the upstream-side valve flow rate estimation model.

As described above, in the second modification, both the upstream-side valve flow rate and the downstream-side valve flow rate can be obtained as estimated values by the observer based on a mathematical model, and flow rate control with improved responsiveness and control stability can be achieved.

Figure 6:
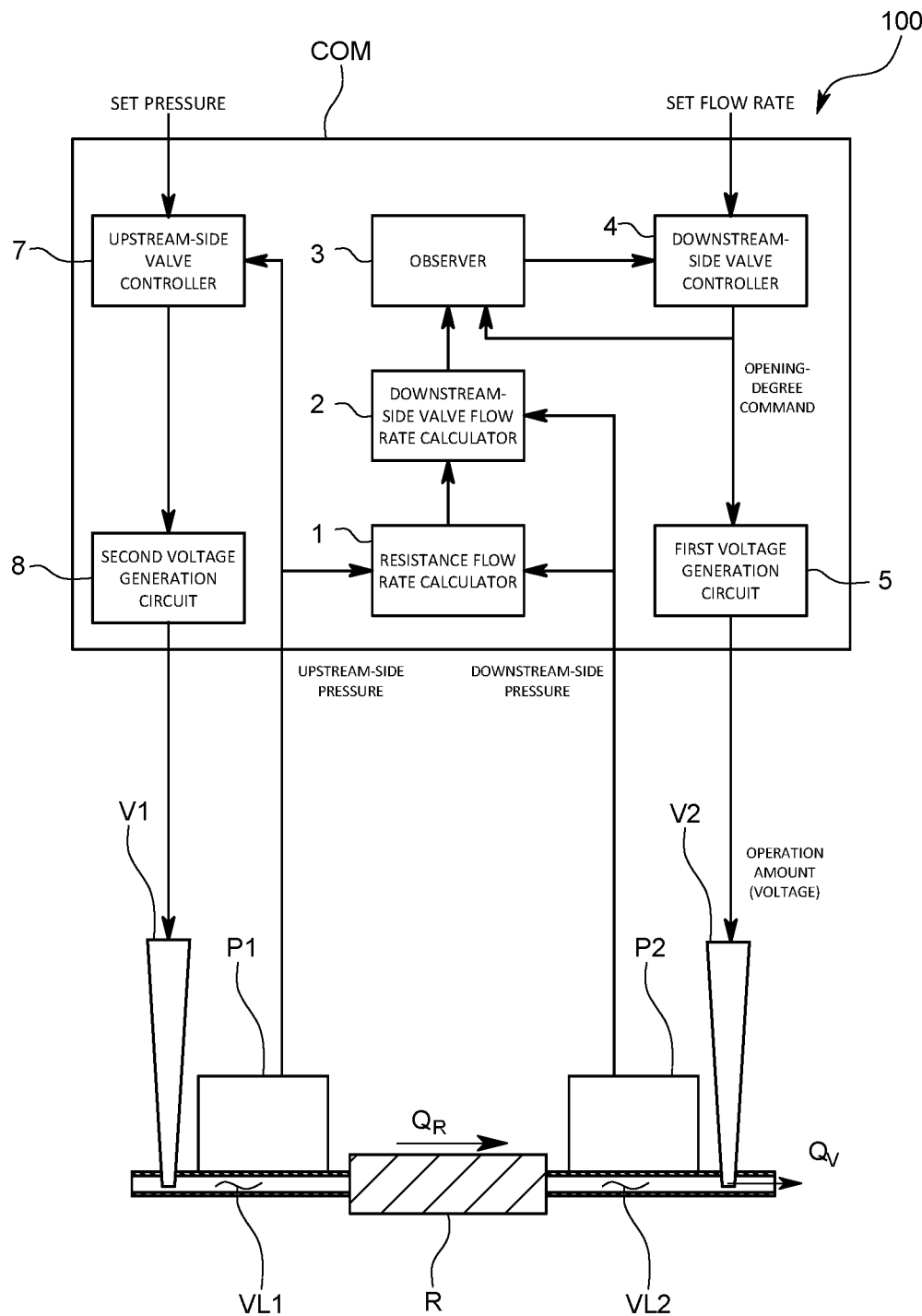
FIG. 6 is a schematic diagram illustrating a configuration of a flow rate control apparatus according to a second embodiment of the present invention.

Next, a flow rate control apparatus 100 according to a second embodiment of the present invention will be described with reference to FIG. 6. Note that, in the following description of each embodiment, the same reference numerals are assigned to portions corresponding to the respective portions described in the first embodiment.

The flow rate control apparatus of the second embodiment has the same control configuration of the downstream-side valve V2 as that of the first embodiment, but is different in that the upstream-side valve V1 is controlled on the basis of pressure instead of the flow rate.

Specifically, the upstream-side valve controller controls the upstream-side valve V1 on the basis of a deviation between the set pressure set by the user and the upstream-side pressure measured by the upstream-side pressure sensor P1. Here, the set pressure is set based on a pressure difference to be maintained before and after the fluid resistance R when the downstream-side valve flow rate is stabilized at the set flow rate.

With such a flow rate control apparatus 100, the downstream-side valve flow rate passing through the downstream-side valve V2 can be controlled in a state where the supply pressure is maintained constant and the downstream-side valve flow rate is hardly affected by disturbance due to pressure fluctuation from the upstream side. In other words, the differential pressure before and after the fluid resistance R is less likely to change at a high speed as in the first embodiment, but the stability of the flow rate control is improved. For example, in a case where the supplied fluid is a source gas obtained by vaporizing a liquid source or the like, a constant flow rate is likely to be continuously supplied even when the generated amount is not stable. In addition, since the downstream-side valve flow rate is estimated by the observer 3 and the control is performed based on the estimated value, the responsiveness of the flow rate control can be improved as compared with a combination of the conventional simple pressure feedback control and the flow rate feedback control.

Figure 7:
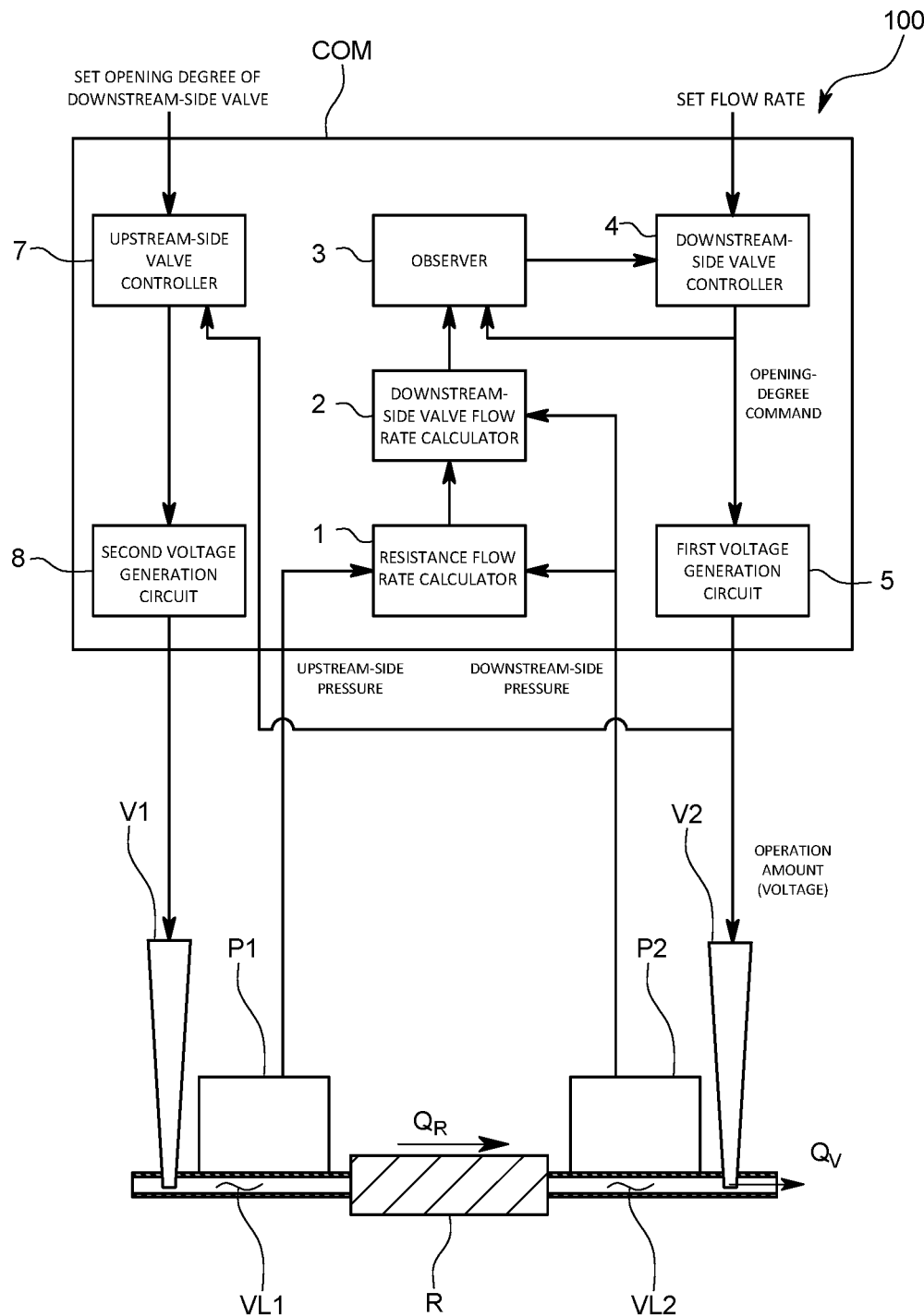
FIG. 7 is a schematic diagram illustrating a configuration of a flow rate control apparatus according to a third embodiment of the present invention.

Next, a flow rate control apparatus 100 according to a third embodiment of the present invention will be described with reference to FIG. 7. Note that, in the following description of each embodiment, the same reference numerals are assigned to portions corresponding to the respective portions described in the first embodiment.

The flow rate control apparatus 100 of the third embodiment is different from the first embodiment in the configuration of the upstream-side valve controller 7. That is, the voltage applied from the first voltage generation circuit 5 to the downstream-side valve V2 is fed back to the upstream-side valve controller 7, and the opening degree of the upstream-side valve V1 is controlled based on the deviation from the set voltage set by the user. As the set voltage, for example, a voltage corresponding to the opening degree maintained in the downstream-side valve V2 is input. The sensitivity can be enhanced as the pressure-type flow rate measurement using the upstream-side pressure sensor P1, the fluid resistance R, and the downstream-side pressure sensor P2 is lower. Therefore, as the set voltage, a voltage corresponding to an opening degree at which the pressure is reduced to a low pressure at which desired flow rate sensitivity can be realized is set by the user. The downstream-side valve controller 4 controls the voltage applied to the downstream-side valve V2 corresponding to the pressure on the upstream side, and performs control so that the estimated value of the downstream-side valve flow rate by the observer 3 coincides with the set flow rate. In this state, the upstream-side valve controller 7 closes the opening degree of the upstream-side valve V1 so as to decrease the absolute value of the pressure before and after the fluid resistance R, and narrows the gas supply. As a result, it is possible to reduce the pressure of the gas in the flow rate control apparatus 100 while achieving a desired flow rate, and to enhance the measurement sensitivity of the flow rate.

Next, a flow rate control apparatus 100 according to a fourth embodiment of the present invention will be described with reference to FIG. 8.

Figure 8:
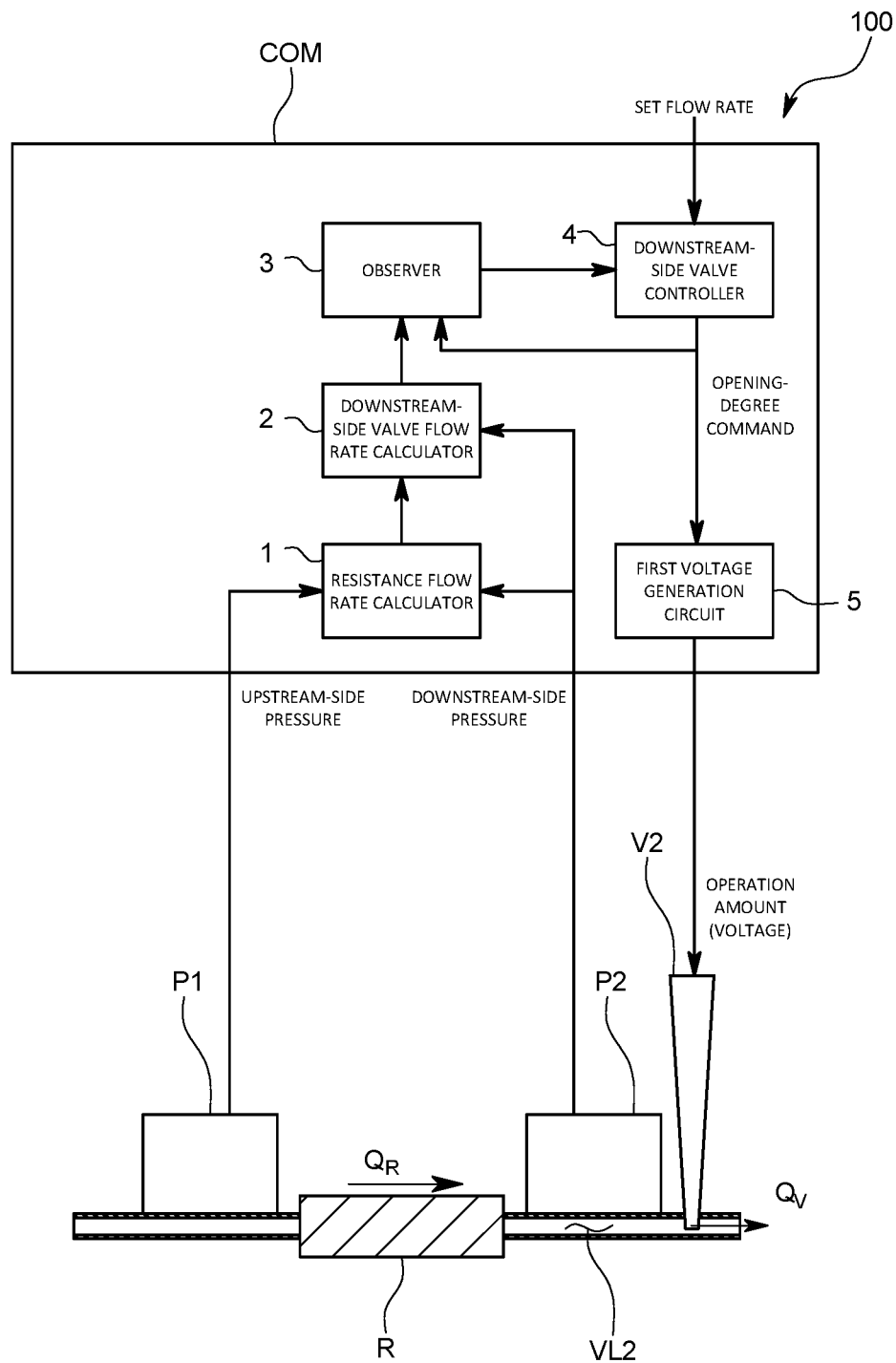
FIG. 8 is a schematic diagram illustrating a configuration of a flow rate control apparatus according to a fourth embodiment of the present invention.

The flow rate control apparatus 100 of the fourth embodiment is different from that of the first embodiment in that an upstream-side valve V1 and an upstream-side valve controller 7 are omitted as illustrated in FIG. 8.

Even in such a flow rate control apparatus 100 of the fourth embodiment, as compared with the conventional flow rate control apparatus 100 including a single valve, it is possible to perform flow rate control with high responsiveness on the basis of the time delay estimated by the observer 3 and the downstream-side valve flow rate with less noise.

Next, a flow rate control apparatus 100 according to a fifth embodiment of the present invention will be described with reference to FIGS. 9 to 11.

The flow rate control apparatus 100 of the fifth embodiment is configured to continue the flow rate control only with the estimated value output from the observer 3 without using the measured value of a downstream-side valve flow rate meter VFS for the flow rate control, for example, when an abnormality occurs in the downstream-side valve flow rate meter VFS or a sensor constituting the downstream-side valve flow rate meter VFS. Specifically, as illustrated in FIGS. 9 and 10, the flow rate control apparatus 100 of the fifth embodiment is different from that of the first embodiment in terms of a configuration including an abnormal mode switch AMS, a normal value storage unit, and a rollback unit RB. Each unit will be described in detail below.

Figure 9:
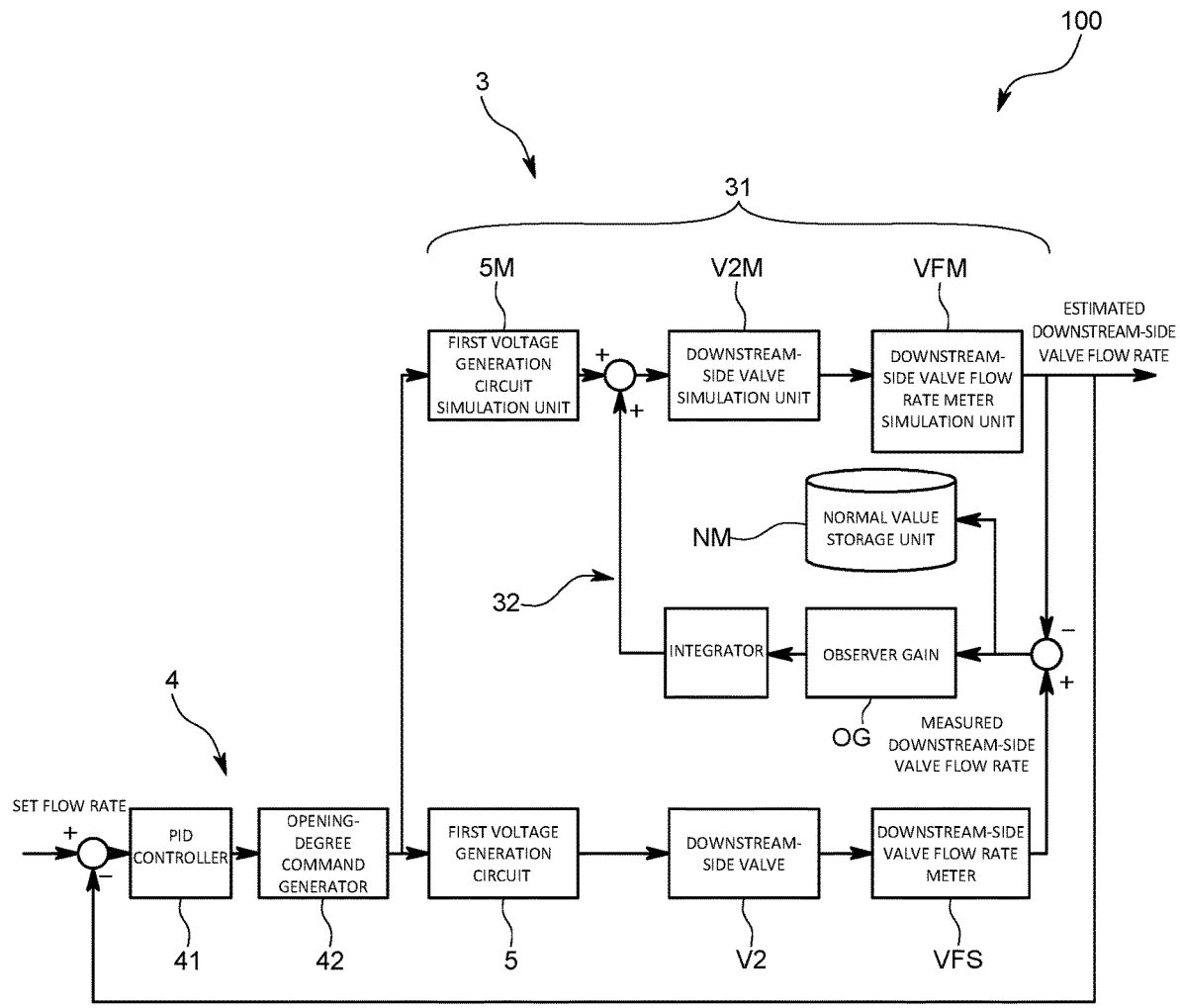
FIG. 9 is a schematic diagram illustrating a configuration of a flow rate control apparatus in a normal mode according to a fifth embodiment of the present invention.
Figure 9:
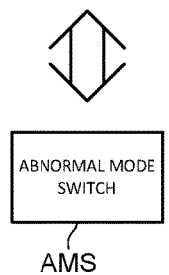
Figure 10:
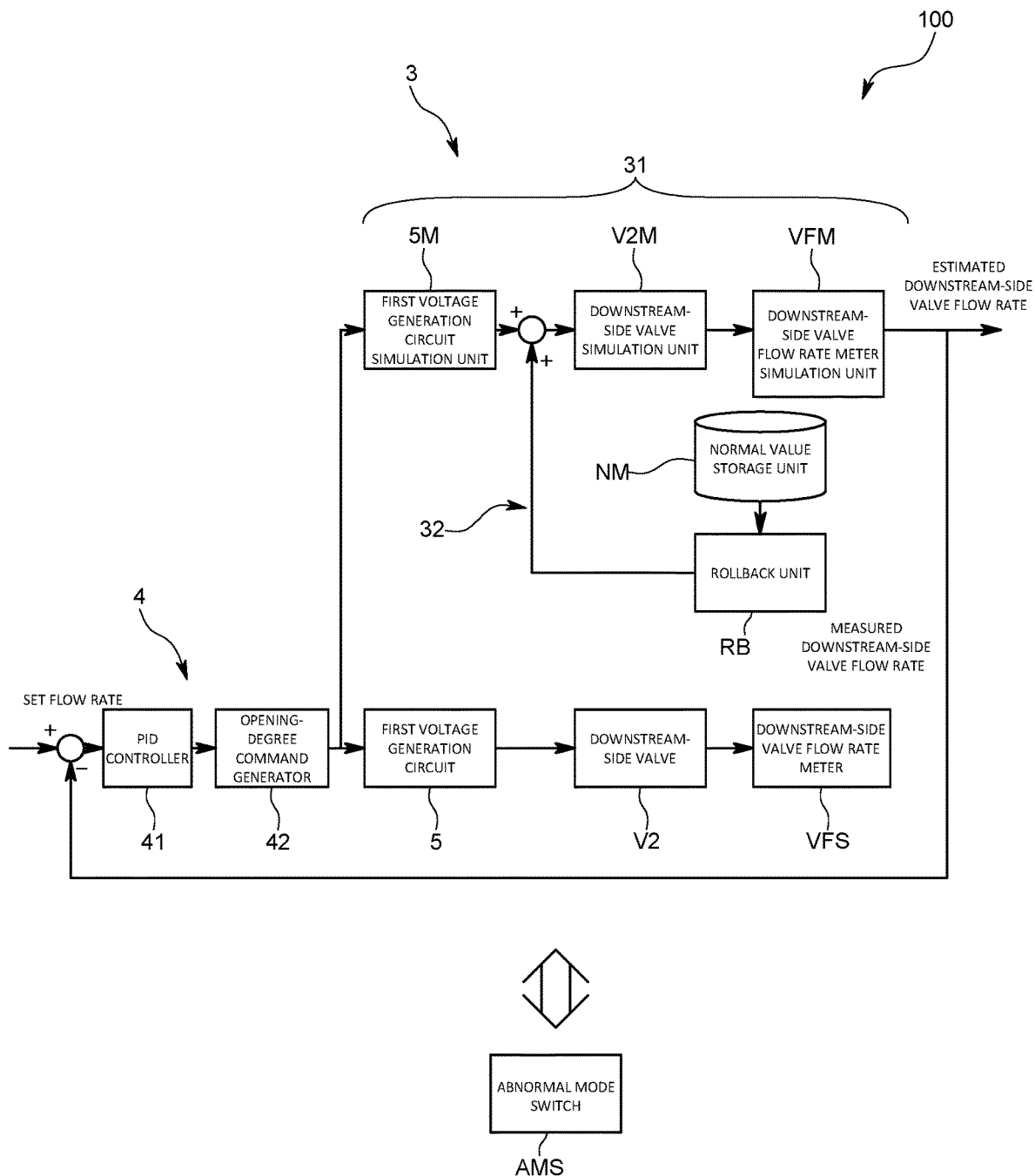
FIG. 10 is a schematic diagram illustrating a configuration of the flow rate control apparatus in an abnormal mode according to the fifth embodiment.
Figure 11:
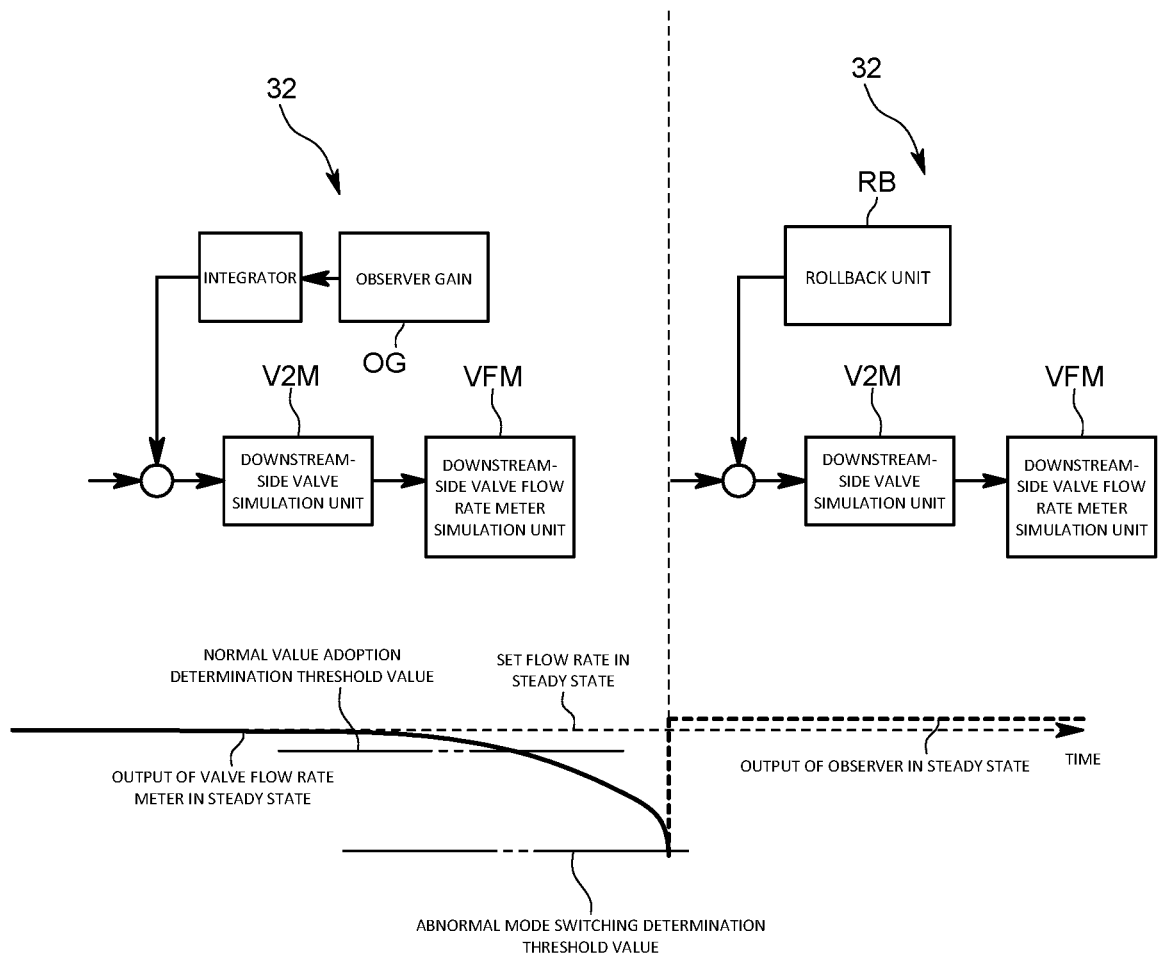
FIG. 11 is a schematic diagram illustrating an operation image of the flow rate control apparatus in a normal mode and an abnormal mode according to the fifth embodiment.

The abnormal mode switch AMS switches the control configuration of the flow rate control apparatus 100 from the normal mode illustrated in FIG. 9 to the abnormal mode illustrated in FIG. 10 at least when an abnormality occurs in the downstream-side valve flow rate meter VFS. More specifically, the abnormal mode switch AMS monitors the measured value of the flow rate output from the downstream-side valve flow rate meter VFS or the internal parameter used in the downstream-side valve flow rate meter VFS, and determines whether an abnormality occurs in the downstream-side valve flow rate meter VFS on the basis of the monitored value. In addition, when determining that an abnormality has occurred in the downstream-side valve flow rate meter VFS, the abnormal mode switch AMS disconnects a loop of the control configuration of the flow rate control apparatus 100 so that the measured value of the flow rate output from the downstream-side valve flow rate meter VFS is not used in the flow rate control loop as illustrated in FIG. 10. Instead, the abnormal mode switch AMS switches the control configuration so that the flow rate control loop is configured only with the flow rate estimated by the observer 3.

The determination of the abnormal mode by the abnormal mode switch AMS is performed, for example, in a steady state in which the flowing flow rate is maintained at a substantially constant value. In other words, when the target value of the set flow rate changes stepwise and the flowing flow rate is in a transient state, the abnormal mode switch AMS does not perform abnormality determination by the deviation described above. That is, the abnormal mode switch AMS monitors, for example, a deviation between the flow rate value measured by the downstream-side valve flow rate meter VFS and the target value of the set flow rate in a period in which the target value of the set flow rate is maintained constant, and determines that an abnormality has occurred in the downstream-side valve flow rate meter VFS when an absolute value of the deviation exceeds a predetermined abnormal mode switching determination threshold value. After the abnormality determination, the abnormal mode switch AMS also continues alarm display notifying the user that an abnormality has occurred.

The normal value storage unit NM stores, as a normal value, a value obtained when a deviation (innovation) between the flow rate measured by the downstream-side valve flow rate meter VFS and the flow rate estimated by the observer 3 satisfies a predetermined standard while the flow rate control apparatus 100 is operating in the normal mode. Specifically, in a steady state in which the target value of the set flow rate is maintained at a constant value, when the absolute value of the difference between the target value of the set flow rate and the flow rate value output from the downstream-side valve flow rate meter VFS is smaller than a normal value adoption determination threshold value, the normal value storage unit NM stores the above-described innovation as a normal value. For example, the normal value storage unit NM may hold only the latest normal value, or may hold a plurality of normal values together with date and time or time.

When the control configuration of the flow rate control apparatus 100 is switched to the abnormal mode by the abnormal mode switch AMS, the rollback unit RB inputs a fixed value calculated by multiplying the normal value stored in the normal value storage unit NM by a predetermined value to the downstream-side valve flow rate estimation model 31. That is, in the abnormal mode, the outputs of the downstream-side valve flow rate meter VFS and the downstream-side valve flow rate meter simulation unit VFM are not input to the rollback unit RB constituting the observer gain unit 32. Instead, the rollback unit RB calculates the output as the observer gain unit 32 using the normal value input when operating in the normal mode. Therefore, the value output from the observer gain unit 32 in the abnormal mode is output on the assumption that the modeling error of the downstream-side valve flow rate estimation model 31 is the same as that in the normal mode.

Control operations in the normal mode and the abnormal mode by the flow rate control apparatus 100 of the fifth embodiment configured as described above will be described with reference to FIG. 11.

The operation in the normal mode is substantially the same as the control operation in the first embodiment, and when the absolute value of the innovation, which is the deviation between the flow rate value measured by the downstream-side valve flow rate meter VFS and the flow rate value estimated by the downstream-side valve flow rate meter simulation unit VFM in the steady state, is smaller than the normal value adoption determination threshold value, the absolute value is stored as a normal value in the normal value storage unit NM.

In addition, when any abnormality occurs in the downstream-side valve flow rate meter VFS, and the absolute value of the difference between the measured value output from the downstream-side valve flow rate meter VFS and the set flow rate becomes larger than the abnormal mode switching threshold value in the steady state, the abnormal mode switching unit determines that an abnormality has occurred.

The abnormal mode switching unit switches the control configuration of the flow rate control apparatus 100 to the abnormal mode so that the output of the downstream-side valve flow rate meter VFS is not used by the observer 3, and the output from the observer gain unit 32 is output from the rollback unit RB. That is, the rollback unit RB outputs a fixed value obtained by multiplying the normal value stored in the normal value storage unit NM by a predetermined value to the downstream-side valve flow rate estimation model 31. As a result, the state of the observer 3 is rolled back to the state before the abnormality occurs, and from this state, the flow rate feedback control in the flow rate control apparatus 100 is continued only with the estimated value of the observer 3.

With the flow rate control apparatus 100 of the fifth embodiment configured as described above, even when an abnormality occurs in the sensor or the like constituting the downstream-side valve flow rate meter VFS, the flow rate control can be continued based only on the estimated value of the flow rate output from the observer 3 without interrupting the flow rate control. In addition, since the flow rate estimated by the observer 3 is obtained by correcting the modeling error with the value calculated based on the innovation in the normal mode, the divergence from the actually flowing flow rate can be reduced. Therefore, the flow rate supplied from the flow rate control apparatus 100 can be made to generate only an allowable error with respect to the set flow rate, and it is possible to maintain the yield of the wafer higher than when the process is interrupted.

A modification of the flow rate control apparatus 100 of the fifth embodiment will be described.

The normal value stored in the normal value storage unit NM may not be the above-described innovation, but may be the value itself output by the observer gain unit 32 in the normal mode. In such a case, the rollback unit RB may be configured to directly input the normal value to the downstream-side valve flow rate estimation model 31.

The abnormality determination algorithm in the abnormal mode switch AMS is not limited to that described above. For example, when the output of the downstream-side valve flow rate meter VFS is overranged, it may be determined that an abnormality has occurred. In addition, whether or not an abnormality has occurred may be determined based on outputs of various sensors constituting the downstream-side valve flow rate meter VFS or outputs of an electric circuit.

For example, in order to continue the flow rate control with a predetermined control accuracy even in the abnormal mode while using the configuration of the flow rate control apparatus 100 of the first embodiment as it is, it is sufficient if the abnormal mode switch AMS is configured to change the observer gain to 0 with respect to the observer gain unit 32 in the abnormal mode.

Other embodiments will be described.

The upstream-side valve and the downstream-side valve are not limited to the piezo valve, and may be driven by other actuators. Each valve may be, for example, a solenoid valve, or each valve may not be of the same type.

The fluid resistance is not limited to the laminar flow element, and may be, for example, an orifice or a flow dividing element for constituting a thermal flow rate sensor. In short, the fluid resistance is a resistor provided in the flow path, and may be any resistance as long as the volume between the flow path resistance and the downstream-side valve is partitioned and changed to a pressure different from that of other portions.

The resistance flow rate flowing through the fluid resistance is not limited to the flow rate measured by the pressure-type flow rate sensor. For example, the resistance flow rate may be measured by a thermal flow rate sensor in which a flow dividing element is used as the fluid resistance and a pair of temperature measuring elements is provided in a bypass flow path formed by a narrow tube that bypasses the flow dividing element. In this case, by separately providing a downstream-side pressure sensor for measuring the pressure of the downstream-side volume between the flow dividing element and the downstream-side valve, it is possible to perform control equivalent to that of the flow rate control apparatus of the first embodiment.

The input parameter input to the observer for estimating the downstream-side valve flow rate is not limited to the opening-degree command. The input parameter may be, for example, a set flow rate or a voltage input to the downstream-side valve. Among the elements in the real system, the elements included in the downstream-side valve flow rate estimation model may be increased or decreased depending on the type of the input parameter. Further, among the elements, an element having an ideal response in which a time delay or the like can be almost ignored may be excluded from the elements constituting the downstream-side valve flow rate estimation model. That is, the flow rate estimation model is not limited to the one described in each embodiment. The downstream-side valve flow rate estimation model may be, for example, a mathematical equation based on the physical law satisfied by each element of the control system, or may be experimentally determined from a step response or the like.

In addition, modifications of various embodiments and elements of each embodiment may be combined without departing from the spirit of the present invention.

DESCRIPTION OF REFERENCE CHARACTERS

100: flow rate control apparatus
P1: upstream-side pressure sensor
P2: downstream-side pressure sensor
V1: upstream-side valve
V2: downstream-side valve
VL1: upstream-side volume
VL2: downstream-side volume
COM: control apparatus
1: resistance flow rate calculator
2: downstream-side valve flow rate calculator
3: observer
31: downstream-side valve flow rate estimation model
V2M: downstream-side valve simulation unit
5M: first voltage generation circuit simulation unit
VFM: downstream-side valve flow rate meter simulation unit
32: observer gain unit
OG1: first observer gain
OG2: second observer gain
SW: switch
4: downstream-side valve controller
41: PID controller
42: opening-degree command generator
5: first voltage generation circuit
6: upstream-side valve flow rate calculator
7: upstream-side valve controller
8: second voltage generation circuit
9: sub-observer
AMS: abnormal mode switch
NM: normal value storage unit
RB: rollback unit

What is claimed is:

1. A flow rate control apparatus comprising:
   a fluid resistance provided in a flow path;
   a downstream-side valve provided on a downstream side of the fluid resistance;
   a downstream-side valve flow rate meter that measures a downstream-side valve flow rate that is a flow rate of a fluid passing through the downstream-side valve, on a basis of a resistance flow rate that is a flow rate of the fluid flowing through the fluid resistance and a temporal change amount of a downstream-side pressure that is a pressure in an internal volume between the fluid resistance and the downstream-side valve;
   an observer including a downstream-side valve flow rate estimation model that estimates the downstream-side valve flow rate on a basis of an input parameter that changes an opening degree of the downstream-side valve;
   a first voltage generation circuit that outputs a voltage corresponding to an opening-degree command that is input to the downstream-side valve to vary the opening degree of the downstream-side valve; and
   a downstream-side valve controller that controls the opening degree of the downstream-side valve by comparing a target value of a set flow rate to the estimated downstream-side valve flow rate output from the observer and, in response to a deviation between the target value of the set flow rate and the estimated value of the downstream-side valve flow rate, drive the first voltage generation circuit to vary the opening degree of the downstream-side valve, wherein
   the observer is configured to be fed back a deviation between a measured value of the downstream-side valve flow rate output from the downstream-side valve flow rate meter and the estimated value of the downstream-side valve flow rate output from the downstream-side valve flow rate estimation model;
   the downstream-side valve flow rate estimation model includes a first voltage generation circuit simulation unit configured to simulate characteristics of the first voltage generation circuit; and
   the downstream-side valve flow rate estimation model further simulates characteristics of the downstream-side valve and the downstream-side valve flow rate meter.

2. The flow rate control apparatus according to claim 1, wherein
   the observer receives the opening-degree command as the input parameter and estimates the downstream-side valve flow rate.

3. The flow rate control apparatus according to claim 2, wherein the downstream-side valve flow rate estimation model simulates a time delay in the first voltage generation circuit.

4. The flow rate control apparatus according to claim 2, wherein
   the downstream-side valve controller includes:
      a proportional-integral-derivative (PID) controller that performs a PID calculation on a basis of the deviation between the target value of the set flow rate and the estimated value of the downstream-side valve flow rate output from the observer; and
      an opening-degree command generator that generates the opening-degree command corresponding to a PID calculation result from the PID controller.

5. The flow rate control apparatus according to claim 1, wherein the observer further includes an observer gain unit that multiplies the deviation between the measured value of the downstream-side valve flow rate and the estimated value of the downstream-side valve flow rate by an observer gain.

6. The flow rate control apparatus according to claim 5, wherein
   the observer gain unit includes:
      a first observer gain that is used when a flow rate of a fluid flowing through the flow path is stable at a predetermined value; and
      a second observer gain that is used when the flow rate of the fluid flowing through the flow path changes and has a value larger than that of the first observer gain.

7. The flow rate control apparatus according to claim 1, wherein
   the downstream-side valve flow rate meter includes:
      an upstream-side pressure sensor that is provided on an upstream side of the fluid resistance and measures an upstream-side pressure;
      a downstream-side pressure sensor that is provided between the fluid resistance and the downstream-side valve and measures the downstream-side pressure;
      a resistance flow rate calculator that calculates the resistance flow rate on a basis of the upstream-side pressure and the downstream-side pressure; and
      a downstream-side valve flow rate calculator that calculates the downstream-side valve flow rate by subtracting a value obtained by multiplying the temporal change amount of the downstream-side pressure by a predetermined coefficient from the resistance flow rate.

8. The flow rate control apparatus according to claim 7, further comprising:
   an upstream-side valve provided on an upstream side of the upstream-side pressure sensor; and
   an upstream-side valve controller that controls an opening degree of the upstream-side valve.

9. The flow rate control apparatus according to claim 8, further comprising
   an upstream-side valve flow rate calculator that calculates an upstream-side valve flow rate passing through the upstream-side valve by adding a value obtained by multiplying a temporal change amount of the upstream-side pressure by a predetermined coefficient from the resistance flow rate, wherein
   the upstream-side valve controller controls the opening degree of the upstream-side valve so as to reduce a deviation between the set flow rate and the upstream-side valve flow rate.

10. The flow rate control apparatus according to claim 8, further comprising:
    an upstream-side valve flow rate calculator that calculates an upstream-side valve flow rate passing through the upstream-side valve by adding a value obtained by multiplying a temporal change amount of the upstream-side pressure by a predetermined coefficient from the resistance flow rate; and
    a sub-observer including an upstream-side valve flow rate estimation model that estimates the upstream-side valve flow rate on a basis of an input parameter that changes the opening degree of the upstream-side valve, wherein
    the upstream-side valve controller controls the opening degree of the upstream-side valve so as to reduce a deviation between the target value of the set flow rate and the estimated value of the upstream-side valve flow rate output from the sub-observer.

11. The flow rate control apparatus according to claim 8, wherein the upstream-side valve controller controls the opening degree of the upstream-side valve so as to reduce a deviation between a set pressure and the upstream-side pressure.

12. The flow rate control apparatus according to claim 8, wherein the upstream-side valve controller controls the opening degree of the upstream-side valve so as to reduce a deviation between a set voltage corresponding to an opening degree maintained by the downstream-side valve and a voltage applied to the downstream-side valve.

13. The flow rate control apparatus according to claim 1, wherein the fluid resistance is a laminar flow element, a flow dividing element, or an orifice.

14. The flow rate control apparatus according to claim 1, further comprising an abnormal mode switching unit that operates the observer in an abnormal mode in which feedback of the measured value of the downstream-side valve flow rate output from the downstream-side valve flow rate meter is not performed in the observer at least when an abnormality occurs in the downstream-side valve flow rate meter.

15. The flow rate control apparatus according to claim 14, wherein
the observer includes:
an observer gain unit that multiplies the deviation between the measured value of the downstream-side valve flow rate and the estimated value of the downstream-side valve flow rate by an observer gain at least in a state where the downstream-side valve flow rate meter is normally operating;
a normal value storage unit that stores, as a normal value, a deviation between the measured value of the downstream-side valve flow rate and the estimated value of the downstream-side valve flow rate, or a value obtained by performing a predetermined operation on the deviation, at least in a state where the downstream-side valve flow rate meter is normally operating; and
a rollback unit that inputs a value based on the normal value to the downstream-side valve flow rate estimation model in the abnormal mode.

16. The flow rate control apparatus according to claim 14, wherein
the observer includes an observer gain unit that multiplies the deviation between the measured value of the downstream-side valve flow rate and the estimated value of the downstream-side valve flow rate by an observer gain, and
the observer gain unit is configured to use a value of 0 as the observer gain in the abnormal mode.

17. The flow rate control apparatus according to claim 14, wherein the abnormal mode switching unit is configured to determine whether the downstream-side valve flow rate meter is normally operating or an abnormality has occurred on a basis of the measured value of the downstream-side valve flow rate output from the downstream-side valve flow rate meter or an internal parameter used in the downstream-side valve flow rate meter.

18. A flow rate control method using a flow rate control apparatus including a fluid resistance provided in a flow path and a downstream-side valve provided on a downstream side of the fluid resistance, the flow rate control method comprising:

measuring a downstream-side valve flow rate, which is a flow rate of a fluid passing through the downstream-side valve, on a basis of a resistance flow rate, which is a flow rate of a fluid flowing through the fluid resistance, and a temporal change amount of a downstream-side pressure, which is a pressure in an internal volume between the fluid resistance and the downstream-side valve;
estimating the downstream-side valve flow rate using an observer including a downstream-side valve flow rate estimation model that estimates the downstream-side valve flow rate on a basis of an input parameter that changes an opening degree of the downstream-side valve;
outputting a voltage corresponding to an opening-degree command that is input to the downstream-side valve to vary the opening degree of the downstream-side valve; and
controlling the opening degree of the downstream-side valve by comparing a target value of a set flow rate to the estimated downstream-side valve flow rate output from the observer and, in response to a deviation between the target value of the set flow rate and the estimated value of the downstream-side valve flow rate, drive a first voltage generation circuit to vary the opening degree of the downstream-side valve, wherein
a deviation between the measured value of the downstream-side valve flow rate and the estimated value of the downstream-side valve flow rate output from the downstream-side valve flow rate estimation model is fed back to the observer;
the downstream-side valve flow rate estimation model includes a first voltage generation circuit simulation unit configured to simulate the first voltage generation circuit which is configured to output the voltage corresponding to the opening-degree command that is input to the downstream-side valve; and
the downstream-side valve flow rate estimation model further simulates characteristics of the downstream-side valve and a downstream-side valve flow rate meter.

19. A non-transitory program recording medium in which a program used in a flow rate control apparatus is recorded, the flow rate control apparatus including a fluid resistance provided in a flow path and a downstream-side valve provided on a downstream side of the fluid resistance is recorded, the program causing a computer to function as:
a downstream-side valve flow rate meter that measures a downstream-side valve flow rate that is a flow rate of a fluid passing through the downstream-side valve, on a basis of a resistance flow rate that is a flow rate of a fluid flowing through the fluid resistance and a temporal change amount of a downstream-side pressure that is a pressure in an internal volume between the fluid resistance and the downstream-side valve;
an observer including a downstream-side valve flow rate estimation model that estimates the downstream-side valve flow rate on a basis of an input parameter that changes an opening degree of the downstream-side valve; and
a downstream-side valve controller that controls the opening degree of the downstream-side valve by comparing a target value of a set flow rate to the estimated downstream-side valve flow rate output from the observer and, in response to a deviation between the target value of the set flow rate and the estimated value of the downstream-side valve flow rate, drive a voltage-generation circuit to vary the opening degree of the downstream-side valve, wherein the observer is configured to be fed back a deviation between a measured value of the downstream-side valve flow rate output from the downstream-side valve flow rate meter and the estimated value of the downstream-side valve flow rate output from the downstream-side valve flow rate estimation model;

the downstream-side valve flow rate estimation model includes a first voltage generation circuit simulation unit configured to simulate a first voltage generation circuit which is configured to output a voltage corresponding to an opening-degree command that is input to the downstream-side valve; and the downstream-side valve flow rate estimation model further simulates characteristics of the downstream-side valve and the downstream-side valve flow rate meter.

* * * * *